(12) United States Patent
Seto et al.

(10) Patent No.: US 10,766,330 B2
(45) Date of Patent: Sep. 8, 2020

(54) AIR SUSPENSION SYSTEM

(71) Applicant: HITACHI AUTOMOTIVE SYSTEMS, LTD., Ibaraki (JP)

(72) Inventors: Shinji Seto, Tokyo (JP); Masaki Koyama, Tokyo (JP); Shuhei Nagata, Tokyo (JP); Takashi Ogawa, Tokyo (JP); Yosuke Tanabe, Tokyo (JP); Takahiro Suzuki, Tokyo (JP); Kan Kobayashi, Hitachinaka (JP); Naofumi Harada, Hitachinaka (JP); Yoshinori Kawai, Hitachinaka (JP); Tomoyuki Ri, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 2 days.

(21) Appl. No.: 15/762,942

(22) PCT Filed: Sep. 20, 2016

(86) PCT No.: PCT/JP2016/077646
§ 371 (c)(1),
(2) Date: Mar. 23, 2018

(87) PCT Pub. No.: WO2017/051792
PCT Pub. Date: Mar. 30, 2017

(65) Prior Publication Data
US 2018/0304718 A1 Oct. 25, 2018

(30) Foreign Application Priority Data

Sep. 25, 2015 (JP) .................................. 2015-187588

(51) Int. Cl.
*B60G 17/04* (2006.01)
*B60G 11/27* (2006.01)
(Continued)

(52) U.S. Cl.
CPC .......... *B60G 17/0424* (2013.01); *B60G 11/27* (2013.01); *B60G 17/0408* (2013.01);
(Continued)

(58) Field of Classification Search
CPC .................................................... B60G 11/27; B60G 17/0424; B60G 17/0408; B60G 17/056; B60G 17/0528;
(Continued)

(56) References Cited

U.S. PATENT DOCUMENTS 4,722,548 A * 2/1988 Hamilton ........... B60G 17/0155
188/284
4,881,753 A 11/1989 Shima et al.
(Continued)

FOREIGN PATENT DOCUMENTS

DE 102006052447 A1 5/2008
DE 102014009420 A1 12/2015
(Continued)

OTHER PUBLICATIONS

International Search Report dated Nov. 29, 2016 of the PCT International Application No. PCT/JP2016/077646.
(Continued)

*Primary Examiner* — Thomas W Irvin
(74) *Attorney, Agent, or Firm* — Volpe and Koenig, P.C.

(57) ABSTRACT

In an air suspension system, starting of a compressor is facilitated in a condition in which there exists a pressure difference. There is provided an air suspension system in which air compressed by a compressor is supplied to a plurality of air chambers provided between a vehicle body side and a wheel side and configured to perform vehicle height adjustment in accordance with the supply and discharge of air. The compressor has a needle connected to a
(Continued)

piston and extending in a moving direction of the piston, and an armature reciprocating the needle in the moving direction of the piston.

11 Claims, 14 Drawing Sheets

(51) Int. Cl.
  *F04B 35/04* (2006.01)
  *F04B 39/00* (2006.01)
  *B60G 17/052* (2006.01)
  *B60G 17/056* (2006.01)
(52) U.S. Cl.
  CPC ....... *B60G 17/056* (2013.01); *B60G 17/0523* (2013.01); *B60G 17/0528* (2013.01); *F04B 35/04* (2013.01); *F04B 35/045* (2013.01); *F04B 39/0005* (2013.01); *B60G 2400/51* (2013.01); *B60G 2400/51222* (2013.01); *B60G 2500/02* (2013.01); *B60G 2600/26* (2013.01); *B60G 2800/18* (2013.01)
(58) Field of Classification Search
  CPC ...... B60G 2400/51222; B60G 2500/02; B60G 2600/26; B60G 2800/18; F04B 35/04; F04B 35/045
  See application file for complete search history.

(56) References Cited

U.S. PATENT DOCUMENTS

| | | | | |
|---|---|---|---|---|
| 6,371,459 | B1* | 4/2002 | Schick | B60G 17/0152 267/131 |
| 8,191,874 | B2* | 6/2012 | Inoue | B60G 11/27 188/267 |
| 9,931,900 | B2* | 4/2018 | Oishi | B60G 11/27 |
| 10,603,973 | B2* | 3/2020 | Kasuya | G06F 11/0739 |
| 2003/0173836 | A1 | 9/2003 | Inagai et al. | |
| 2004/0005222 | A1 | 1/2004 | Yoshida et al. | |
| 2004/0115067 | A1* | 6/2004 | Rush | A61M 5/14216 417/322 |
| 2008/0138211 | A1* | 6/2008 | Mount | F04B 43/0081 417/53 |
| 2010/0046862 | A1 | 2/2010 | Schubert | |
| 2010/0230876 | A1* | 9/2010 | Inoue | B60G 11/27 267/140.14 |
| 2012/0193845 | A1 | 8/2012 | Yamanaka | |
| 2016/0230750 | A1* | 8/2016 | Boehmer | F04B 11/0033 |
| 2017/0341480 | A1* | 11/2017 | Oishi | B60G 11/27 |
| 2018/0194188 | A1* | 7/2018 | Kasuya | G06F 11/0739 |
| 2020/0079169 | A1* | 3/2020 | Yoshida | B60G 17/052 |

FOREIGN PATENT DOCUMENTS

| | | |
|---|---|---|
| JP | 02-003516 A | 1/1990 |
| JP | 2003-148339 A | 5/2003 |
| JP | 2003-244921 A | 8/2003 |
| JP | 2003-339188 A | 11/2003 |
| JP | 2012-159011 A | 8/2012 |
| JP | 2013-154834 A | 8/2013 |

OTHER PUBLICATIONS

German Office Action dated May 14, 2020 for the German Patent Application No. 11 2016 003 696.5.

\* cited by examiner (a)

(b)

(a)

(b)

AIR SUSPENSION SYSTEM

TECHNICAL FIELD

The present invention relates to an air suspension system.

BACKGROUND ART

Patent Document 1 discloses an air suspension system which performs vehicle height adjustment by supplying and discharging air compressed by a compressor to and from an air suspension.

PRIOR ART DOCUMENT

Patent Document

Patent Document 1: JP-2012-159011-A

SUMMARY OF THE INVENTION

Problem to be Solved by the Invention

The compressor compresses air sucked in through a suction port and sends it to a discharge port. The compressed air sent to the discharge port flows from the discharge port into an air chamber, and can increase the vehicle height. Usually, for reasons such as efficiency in vehicle height adjustment, an air suspension system is constructed such that the pressure of piping on the discharge port side is maintained, so that there is likely to be generated a state in which the discharge port side pressure is higher than the suction port side pressure (differential pressure state) even when the compressor has not been started. Here, in the compressor of the air suspension system of Patent Document 1, the output of a rotary motor is converted to a linear motion by a crank mechanism. Thus, in the case where the driving is stopped at or in the vicinity of the bottom dead center of the piston, when an attempt is made to re-start the compressor, the piston cannot move if the air in the compression chamber, which is under a relatively high pressure, is not further compressed. Since there is little or no angular momentum of the rotation system including a balance weight immediately before this compressing operation, a large driving force is required to complete the compressing operation and to start the compressor.

In the case where the starting of the compressor is difficult due to the large driving force thus required, it is necessary to diminish the differential pressure by, for example, discharging the air in the discharge side piping. When, however, the discharge side air is discharged, it is necessary to compress air in an amount corresponding to the amount of air discharged at the early drive stage of the compressor in order to increase the vehicle height again, resulting in deterioration in the readiness of the compressor and in an increase of the amount of energy used. Thus, there is a demand for the maintenance of the pressure in the air chamber situated on the discharge side and in the discharge port.

It is an object of the present invention to facilitate starting of a compressor in an air suspension system in a condition in which there exists a compressor pressure difference.

Means for Solving the Problem

The present invention has been made in view of the above circumstances. In accordance with the present invention, there is provided an air suspension system in which air compressed by a compressor is supplied to a plurality of air chambers provided between a vehicle body side and a wheel side and configured to perform vehicle height adjustment in accordance with the supply and discharge of air. The compressor has a needle connected to a piston and extending in a moving direction of the piston, and an armature reciprocating the needle in the moving direction of the piston.

Effect of the Invention

According to the present invention, it is possible to provide an air suspension system making it possible to facilitate starting of a compressor in a condition in which there exists a differential pressure.

MODES FOR CARRYING OUT THE INVENTION

Figure 1:
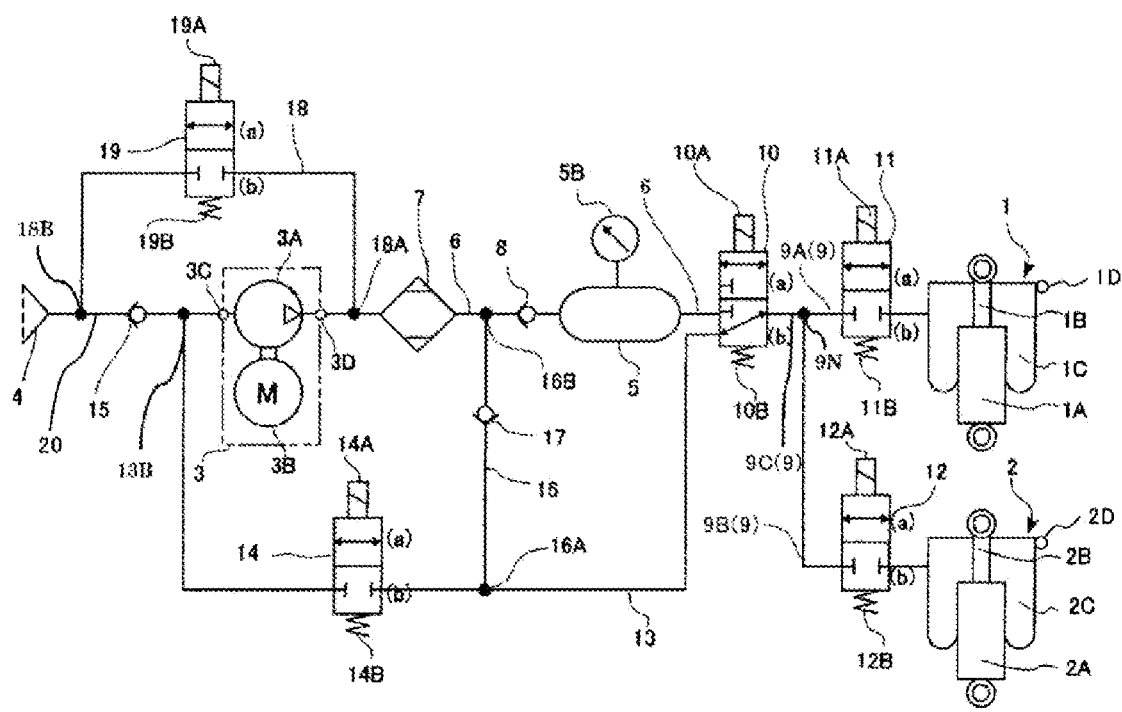
FIG. 1 is a circuit diagram illustrating an air suspension system according to embodiment 1.

In the following, embodiments of the present invention will be described in detail with reference to the appended drawings. The same components are indicated by the same reference numerals, and no redundant description will be repeated. The present invention is not restricted to the specific modes described in connection with the embodiments.

The x-, y-, and z-directions used in the description are orthogonal to each other.

Embodiment 1

[Air Suspension System 100]

Figure 2:
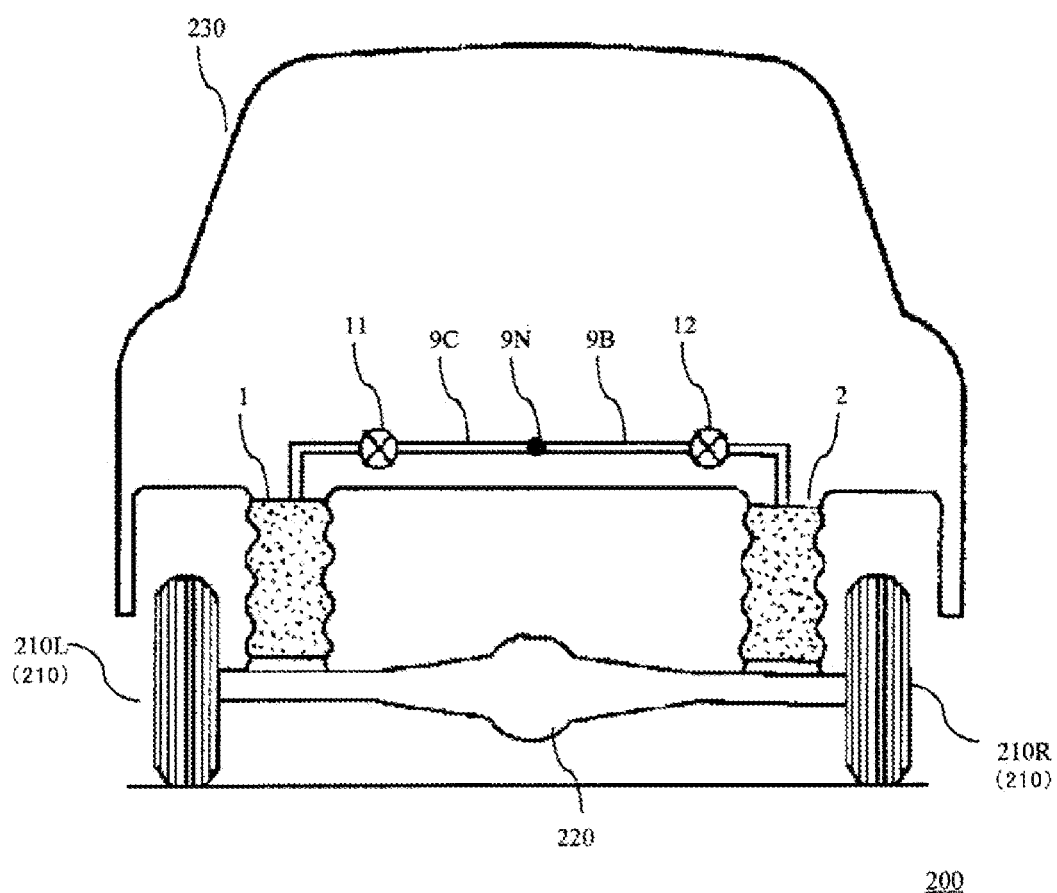
FIG. 2 is a schematic diagram illustrating a vehicle in which the air suspension system of embodiment 1 is mounted.

FIG. 1 is a circuit diagram illustrating an air suspension system 100 according to embodiment 1, and FIG. 2 is a schematic view of a vehicle 200 in which the air suspension system 100 is mounted. Regarding the air suspension system 100 as shown in FIG. 2, solely a distribution point 9N described below and components on the air suspension 1 and 2 sides are shown.

The air suspension system 100 has two air suspensions 1 and 2, a compressor 3 using a linear motor 3B as the drive source, an intake filter 4, a first tank 5, an air dryer 7, three check valves 8, 15, and 17, a supply/discharge switching valve 10, two suspension control valves 11 and 12, a return path opening/closing valve 14, and a discharge path opening/closing valve 19. The air suspension system 100 connects these together by a path through which air can flow.

The air suspension system 100 is a system which is mounted, for example, in a vehicle 200 and which controls the air pressure within air chambers 1C and 2C of the air suspensions 1 and 2. For example, between a left wheel 210L and a right wheel 210R of the vehicle 200, there is provided an axle 220 connecting their hubs, etc. to each other. For example, the air suspensions 1 and 2 are provided between each of the left wheel 210L and the right wheel 210R and a vehicle body 230, or between the hubs and the vehicle body 230, that is, between the wheel 210 side and the vehicle body 230 side, and the air pressure in the air chambers 1C and 2C is controlled, whereby it is possible to adjust the vehicle height.

As shown in FIG. 2, the air suspensions 1 and 2 may be mounted between the axle 220 on the wheel 210 side and the vehicle body 230 of the vehicle 200, or may be mounted between arms and the like (the wheel 210 side) of the suspensions, which connect the wheels 210 and the vehicle body 230, and the vehicle body or between the hubs of the wheels 210 (the wheel 210 side) and the portion in the vicinity of the vehicle body 230 mounting portion (the vehicle body 230 side) of the suspension upper arm. In this way, it is only necessary for the air suspensions 1 and 2 to be provided so as to support the wheels 210 and the vehicle body 230. For example, with respect to the vertical direction, they can be provided between the wheels 210 and the vehicle body 230. They are not restricted to the mode in which they are directly mounted to the wheels 210 and the vehicle body 230.

While in the present embodiment described below the air suspension system 100 has two air suspensions, there are no particular restrictions regarding the number of air suspensions that the air suspension system 100 includes so long as it is one or more. For example, the number of air suspensions may be equal to the number of wheels. In the case, for example, of four-wheel automobile, it is possible to arrange two air suspensions on the side of the two front wheels, and two air suspensions on the side of the two rear wheels, that is, four air suspensions in total. While in the present embodiment buffer cylinders 1A and 2A and the air chambers 1C and 2C constituting the air springs are integrated with each other, it is also possible, as is well known in connection with a large vehicle and the rear suspension side, to provide the buffer cylinders (hydraulic buffers) 1A and 2A and the air springs independently from each other.

[Air Suspensions 1 and 2]

In the air suspensions 1 and 2, the air chambers 1C and 2C are formed between the buffer cylinders 1A and 2A and the piston rods 1B and 2B to form air springs. A path described below is connected to each of the air chambers 1C and 2C, and the pressure and the vehicle height are controlled through the operation of the air suspension system 100.

[Compressor 3]

A compressor can compress air sucked in through a suction port 3C, and discharge it through a discharge port 3D. Details other than this will be described below.

[Intake Filter 4]

An intake filter 4 is provided at an external air intake port through which the air suspension system 100 can take in external air (atmospheric air), and can remove dust or the like in the external air when the air suspension system 100 takes in external air.

[First Tank 5]

A first tank 5 can store compressed air obtained, for example, by compressing air by the compressor 3. The pressure in the first tank 5 can be detected by a pressure sensor 5B.

[Air Dryer 7]

An air dryer 7 contains a drying agent such as silica gel, making it possible to reduce the humidity of the air passing through the air dryer 7.

[Paths of the Air Suspension System 100]

As paths, the air suspension system 100 has a supply/discharge path 9, a supply path 6, a suction side path 20, a return path 13, a bypass path 16, and a discharge path 18.

(Supply/Discharge Path 9)

The supply/discharge path 9 (9A, 9B, 9C) is a path having a first end portion at the air suspension 1, a second end portion at the air suspension 2, and a third end portion at the supply/discharge switching valve 10, and is provided with suspension control valves 11 and 12.

The supply/discharge path 9 has a distribution supply/discharge path 9A, a distribution supply/discharge path 9B, and a combination supply/discharge path 9C, and one end of each of these paths is connected together at the distribution point 9N. One end of the distribution supply/discharge path 9A is connected to the distribution point 9N, and the other end thereof is connected to the air chamber 1C. One end of the distribution supply/discharge path 9B is connected to the distribution point 9N, and the other end thereof is connected to the air chamber 2C. One end of the combination supply/discharge path 9C is connected to the distribution point 9N, and the other end thereof is connected to the supply/discharge switching valve 10.

(Supply Path 6)

The supply path 6 is a path having a first end portion at the supply/discharge switching valve 10, and a second end portion at the discharge port 3D of the compressor 3, and is provided with the first tank 5, the air dryer 7, and the first check valve 8.

In the supply path 6, a bypass terminal 16B is situated on the side opposite the discharge port 3D with respect to the air dryer 7. Connected to the bypass terminal 16B is a second end portion of the bypass path 16 described below.

In the supply path 6, a discharge starting point 18A is situated on the same side as the discharge port 3D with respect to the air dryer 7. Connected to the discharge starting point 18A is a first end portion of the discharge path 18 described below.

The first tank 5 is situated between the first end portion of the supply path 6 and the first check valve 8.

The air dryer 7 is situated between the bypass terminal 16B and the discharge starting point 18A. As described below, the air suspension system 100 can bypass the compressor 3 and dissipate the air in the air chambers 1C and 2C into the atmosphere. In this process, the air flows via the bypass path 16 and the discharge path 18, so that the dry air in the air chambers 1C and 2C flows, making it possible to remove the water in the drying agent in the air dryer 7.

The first check valve 8 is situated between the bypass terminal 16B and the first tank 5. The first check valve 8 allows air flow from the second end portion side to the first end portion side of the supply path, and cuts off a flow reverse thereto. As a result, it is possible to prevent the air in the first tank 5 from flowing into the compressor 3 and the discharge path 18.

(Suction Side Path 20)

The suction side path 20 is a path having a first end portion at the suction port 3C and a second end portion at the external air intake port, and is provided with a second check valve 15.

A return terminal 13B is situated between the suction port 3C of the suction side path 20 and the second check valve 15. Connected to the return terminal 13B is a second end portion of the return path 13 described below.

A discharge terminal 18B is situated between the second check valve 15 and the external air intake port. Connected to the discharge terminal 18B is a second end portion of the discharge path 18 described below.

The second check valve 15 is situated between the return terminal 13B and the discharge terminal 18B. The second check valve 15 allows circulation of air from the second end portion side to the first end portion side of the suction side path 20, and cuts off a flow reverse thereto as described in detail below. As a result, it is possible to prevent the air in the air chambers 1C and 2C having passed the return path 13 and a return path opening/closing valve 14 from being discharged from the external air intake port, and it is possible to guide it to the suction port 3C.

(Return Path 13)

The return path 13 is a path having a first end portion at the supply/discharge switching valve 10, and a second end portion at the return terminal 13B, and the return path opening/closing valve 14 is arranged therein.

In the return path 13, a bypass starting point 16A is situated between the supply/discharge switching valve 10 and the return path opening/closing valve 14. Connected to the bypass starting point 16A is a first end portion of the bypass path 16 described below.

(Bypass Path 16)

The bypass path 16 is a path having the first end portion at the bypass starting point 16A and the second end portion at the bypass terminal 16B, with a third check valve 17 being arranged therein.

The third check valve 17 allows air circulation from the first end portion side to the second end portion side of the bypass path 16, and cuts off a flow reverse thereto. As a result, it is possible to for the air discharged from the discharge port 3D to be effectively guided to the first tank 5.

(Discharge Path 18)

The discharge path 18 is a path having a first end portion at the discharge starting point 18A and a second end portion at the discharge terminal 18B, with a discharge path opening/closing valve 19 being arranged therein.

The second end portion of the discharge path 18 may not be connected to the discharge terminal 18B, and the air may be discharged from a place other than the external air intake port. When, however, as in the present embodiment, the discharge terminal 18B is provided between the external air intake port and the second check valve 15, it is possible to remove dust adhering to the intake filter 4 by the air discharged through the return path 13, the bypass path 16, and the discharge path 18.

[Various Valves of the Air Suspension System 100]

As described above, in addition to the check valves 8, 15, and 17, the air suspension system 100 has the supply/discharge switching valve 10, the two suspension control valves 11 and 12, the return path opening/closing valve 14, and the discharge path opening/closing valve 19.

(Supply/Discharge Switching Valve 10)

The supply/discharge switching valve 10 is a 3-port/2-position electromagnetic valve connected to three paths, and can switch their connection relationship between two kinds of manners.

The supply/discharge switching valve 10 is connected to the first end portion of the supply path 6, the first end portion of the return path 13, and the third end portion of the supply/discharge path 9.

The supply/discharge switching valve 10 has two positions: One is a supply position (a) connecting the first end portion of the supply path 6 and the third end portion of the supply/discharge path 9 to each other and cutting off the connection between the first end portion of the return path 13 and the third end portion of the supply/discharge path 9. The other is a discharge position (b) connecting the first end portion of the return path 13 and the third end portion of the supply/discharge path 9, and cutting off the connection between the first end portion of the supply path 6 and the third end portion of the supply/discharge path 9. The position switching can, for example, be effected by switching the excitation state of a solenoid 10A. In the present embodiment, when the solenoid 10A is not being excited, the supply/discharge switching valve 10 maintains the discharge position (b) by a spring 10B. When the solenoid 10A is excited, switching to the supply position (a) is effected against the force of the spring 10B.

(Suspension Control Valve 11)

The suspension control valve 11 is provided between the distribution point 9N and the air suspension 1, and the suspension control valve 12 is provided between the distribution point 9N and the air suspension 2.

The suspension control valve 11 is a 2-port/2-position electromagnetic valve connected to two paths and capable of switching their connection relationship between two kinds of manners.

The suspension control valve 11 has two positions: One is an open position (a) where the distribution supply/discharge path 9A is opened to allow the supply and discharge of the air in the air chamber 1C. The other is a closed position (b) where the distribution supply/discharge path 9A is closed to cut off the supply and discharge of the air in the air chamber 1C. The position switching can be effected, for example, by switching the excitation condition of the solenoid 11A. In the present embodiment, when the solenoid 11A is not being excited, the suspension control valve 11 maintains the closed position (b) by a spring 11B. When the solenoid 11A is excited, switching to the open position (a) is effected against the force of the spring 11B.

(Suspension Control Valve 12)

Like the suspension control valve 11, the suspension control valve 12 is a 2-port/2-position electromagnetic valve, and can perform an opening/closing control like that of the suspension control valve 11 on the distribution supply/discharge path 9B. These two suspension control valves 11 and 12 may be controlled simultaneously or independently from each other. For this purpose, the suspension control valve 12 is equipped with a solenoid 12A and a spring 12B.

(Return Path Opening/Closing Valve 14)

Like the suspension control valves 11 and 12, the return path opening/closing valve 14 is a 2-port/2-position electromagnetic valve, and can perform an opening/closing control like that of the suspension control valves 11 and 12 on the interval between the bypass starting point 16A and the return terminal 13B of the return path 13. For this purpose, the return path opening/closing valve 14 is equipped with a solenoid 14A and a spring 14B.

(Discharge Path Opening/Closing Valve 19)

Like the suspension control valves 11 and 12 and the return path opening/closing valve 14, the discharge path opening/closing valve 19 is a 2-port/2-position electromagnetic valve, and can perform an opening/closing control similar to that of the suspension control valves 11 and 12 and the return path opening/closing valve 14 on the interval between the discharge starting point 18A and the discharge terminal 18B of the discharge path 18. For this purpose, the discharge path opening/closing valve 19 is equipped with a solenoid 19A and a spring 19B.

(Other Valve Installation Modes)

The following change in construction is acceptable: Instead of the suspension control valves 11 and 12 provided in the supply/discharge path 9, it is also possible to employ supply/discharge switching valves 10 in the same number as that of the air suspensions, that is, 3-port/2-position valves. More specifically, the first end portion of the supply path 6 is branched off in the same number as the air suspensions (two in the present embodiment), and connected to each supply/discharge switching valve 10. Further, the first end portion of the return path 13 is also branched off in the same number as that of the air suspensions, and connected to each supply/discharge switching valve 10. Further, one end of each of the distribution supply/discharge paths (there are two of them in the present embodiment), and is connected to each supply/discharge switching valve 10 instead of the distribution point 9N.

In the case of the construction changed as described above, during air supply two one or two or more of the air suspensions, it is possible to discharge the air in the other air suspensions.

Further, in the case of a simple system configuration, the suspension control valves 11 and 12 may be abolished, and the distribution supply/discharge path 9B may be provided with a throttle.

[Compressor 3 Utilizing a Linear Motor 3B]

FIG. 3(a) is a sectional view taken along the yz-plane of a compressor 3, and FIG. 3(b) is a sectional view of the compressor 3 taken along line A-A of FIG. 3(a), illustrating an armature 50 and a needle 38 as seen in the z-direction.

The compressor 3 is composed of a compressor main body 3A and a linear motor 3B.

(Compressor Main Body 3A)

The compressor main body 3A has a cylinder 33, a piston 34 slidably arranged inside the cylinder 33, a compression chamber 42 formed by the interior of the cylinder 33 and the piston 34, and a rod 47 one end of which is connected to the piston 34 and the other end of which is connected to a connection portion 35. The connection portion 35 connects the rod 47 and the needle 36 of the linear motor 3B to each other. A reciprocating power of the needle 36 is transmitted to the piston 34 via the connection portion 35 and the rod 47.

The cylinder 33 is equipped with a side wall of a substantially cylindrical configuration in conformity with the side peripheral configuration (the configuration as seen in the z-direction) of the piston 34. At one side in the z-direction of the side wall, there is provided an opening into which the piston 34 is inserted, and, at the other side thereof, there is provided a depth wall having a discharge valve 31 and an intake valve 32. A compression chamber 42 is formed as a space surrounded by the side wall, the piston 34, and the depth wall. The compression chamber 42 and the discharge port 3D are connected to each other via the discharge valve 31. The compression chamber 42 and the suction port 3C are connected to each other via the intake valve 32. As the discharge valve 31, it is possible to adopt, for example, a valve which allows solely airflow from the compression chamber 42 to the discharge port 3D side and which opens when the pressure in the compression chamber 42 is a predetermined value or more. As the intake valve 32, it is possible to adopt, for example, a valve which allows solely airflow from the suction port 3C to the compression chamber 42 and which opens when the pressure in the compression chamber 42 is another predetermined value or less. The intake valve 32 and the discharge valve 31 may be formed by electromagnetic valves which allow control of the valve opening/closing timing.

The piston 34 reciprocates upon receiving the reciprocating power of the needle 36. The reciprocating direction of the piston 34 will be referred to as the z-direction. In particular, the bottom dead center side of the piston 34 will be referred to as the +z-direction, and the top dead center side thereof will be referred to as the −z-direction. The piston 34 is connected to the end portion in the −z-direction of the needle 36 via the rod 47 and the connection portion 35. Through the reciprocating motion in the z-direction of the needle 36, the piston 34 moves, making it possible for the compression chamber 42 to perform the operations of taking-in, compressing, and discharging air.

The air within the compression chamber 42 is compressed or expanded in accordance with the motion of the piston 34, so that the pressure (air pressure) within the compression chamber 42 fluctuates. The air pressure functions as an elastic body (air spring) imparting a force toward the bottom dead center to the piston 34.

(Linear Motor 3B)

The linear motor 3B is a mechanism imparting the reciprocating power to the needle 36. As described in detail below, it can facilitate the starting of the compressor 3. The linear motor 3B has an armature 50 having an iron core 41 and a coil 37 wound around the iron core 41, an end spacer 51, a magnetic spacer 52, a non-magnetic spacer 53, the needle 36 provided with a permanent magnet 38, and a spring 40 as an elastic body which is an example of urging means.

<Armature 50>

The iron core 41 of the armature 50 is formed so as to contain a magnetic body, and has a first magnetic pole tooth 43A and a second magnetic pole tooth 43B as magnetic pole teeth 43, and arm portions 39 connecting the two magnetic pole teeth 43.

The first magnetic pole tooth 43A and the second magnetic pole tooth 43B are opposite each other via a gap in which the needle 36 is arranged. The opposing direction of the first magnetic pole tooth 43A and the second magnetic pole tooth 43B will be referred to as the y-direction. The first magnetic pole tooth 43A and the second magnetic pole tooth 43B are connected to each other by two arm portions 39. The two arm portions 39 extend in the y-direction, and are opposite each other via the needle 36. The opposing direction of the arm portions 39 will be referred to as the x-direction.

The iron core 41 may be formed by integrating the first magnetic pole tooth 43A, the second magnetic pole tooth 43B, and the arm portions 39, or may be separated, for example, halfway through the arm portions 39. For example, the iron core 41 may be divisible into a part having the first magnetic pole tooth 43A and substantially half the dimension in the y-direction of the two arm portions 39 and a part having the second magnetic pole tooth 43B and substantially half the dimension in the y-direction of the two arm portions 39.

The coil 37 of the armature 50 is wound around one or both of the first magnetic pole tooth 43A and the second magnetic pole tooth 43B. For example, a sine wave or a rectangular wave AC current flows through the coil 37. As a result, a magnetic flux is generated from the coil 37, and, as described below, a magnetic force is generated between the magnetic flux and the permanent magnet 38 arranged in the needle 36, making it possible to impart a reciprocating power in the z-direction to the needle 36. In the case where the coil 37 is wound around both of the first magnetic pole tooth 43A and the second magnetic pole tooth 43B, an in-phase current flows through these coils 37.

One or two or more armatures 50 (two in the present embodiment) are arranged in the z-direction. Between the armatures 50, it is possible to provide a magnetic spacer 52 formed of a magnetic body or a non-magnetic spacer 53 formed of a non-magnetic body. As described below, however, from the viewpoint of an increase in the magnetic flux density, it is desirable to use a magnetic spacer 52. Further, it is possible to provide, for example, an end spacer 51 formed of a non-magnetic body or a non-magnetic spacer 53 between the armature 50 and the compressor main body 3A or between the armature 50 and a fixation portion 55 described below, such as in the +z-direction of the armature 50 situated furthermost on the +z-direction side or in the −z-direction of the armature 50 situated furthermost on the −z-direction side.

<Spacer>

Each of the end spacer 51, the magnetic spacer 52, and the non-magnetic spacer 53 has a certain degree of z-direction dimension. They are members capable of adjusting the distance in the z-direction between the armatures 50 or between the armature 50 and some other member. The end spacer 51 is of a configuration surrounding substantially the entire periphery in the x-direction and the y-direction of the connection portion 35, and protects the connection portion 35 from the surroundings. The end spacer 51 and the non-magnetic spacer 53 suppress leakage of the magnetic flux generated in the armature 50 and propagation thereof to the compressor main body 3A and the spring 40. Due to this construction, it is possible to effectively impart a magnetic force to the needle 36 by utilizing the magnetic flux generated in the armature 50. The armature 50, the end spacer 51, the magnetic spacer 52, the non-magnetic spacer 53, and the fixation portion 55 are fixed to each other. This can be effected, for example, by an insertion member such as a bolt extending through these members in the z-direction.

<Needle 36>

Figure 4:
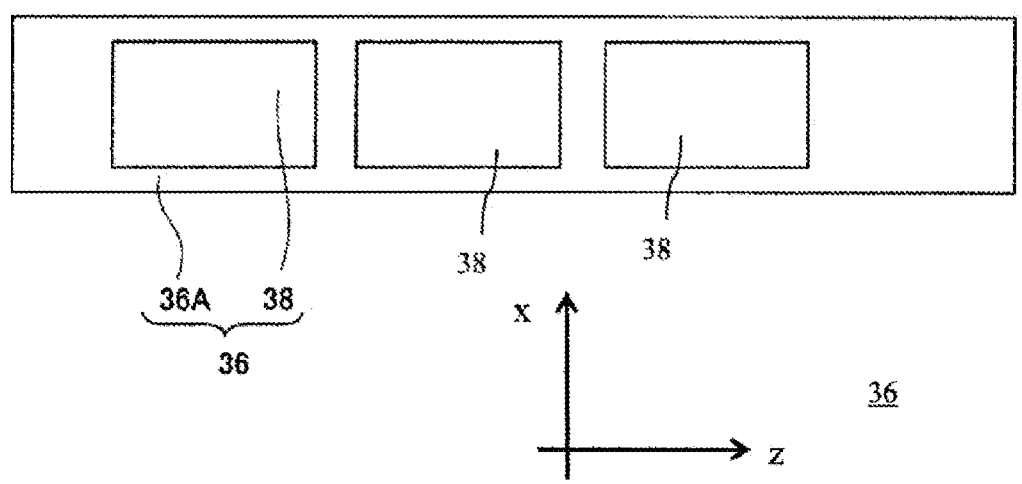
FIG. 4 is a plan view of the needle of embodiment 1.

FIG. 4 is a plan view of the needle 36. The needle 36 has a flat plate portion 36A which has a width in the x-direction and the longitudinal direction of which is the z-direction, and one or two or more permanent magnets 38 arranged on the plate portions 36A. Both the plate portion 36A and the permanent magnet 38 are of a flat configuration the y-direction of which is a normal vector. The permanent magnet 38 is magnetized in the y-direction. In the case where a plurality of permanent magnets 38 are arranged, the permanent magnets 38 arranged in the z-direction may be arranged while alternately reversed in magnetizing direction.

Figure 3:
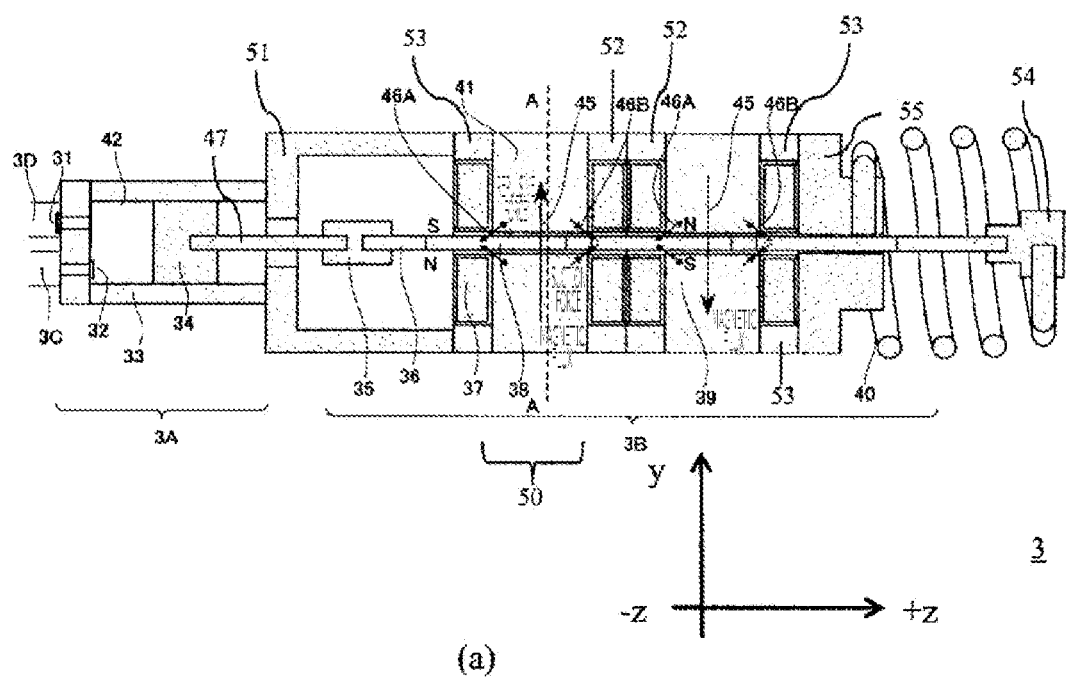
FIG. 3(a) is a sectional view taken along the yz-plane of a compressor of embodiment 1.
FIG. 3(b) is a sectional view of the compressor of embodiment 1 taken along line A-A of FIG. 3(a), illustrating an armature and a needle as seen in the z-direction.
Figure 3:
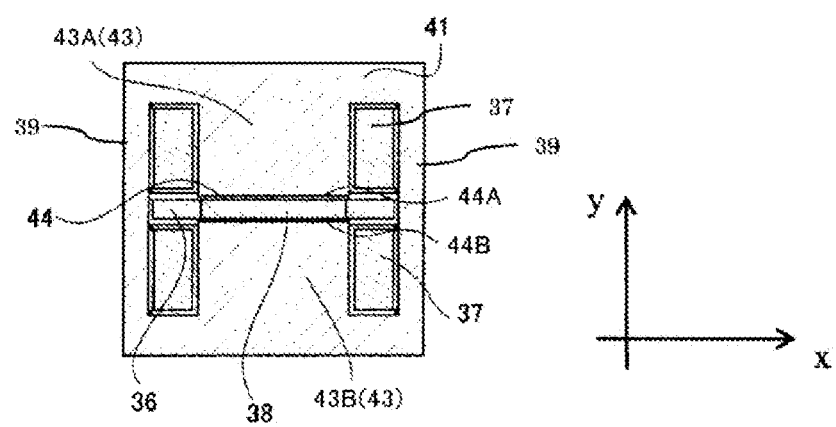

As shown in FIG. 3, the needle 36 is arranged between the first magnetic pole tooth 43A and the second magnetic pole tooth 43B. That is, the first magnetic pole tooth 43A is situated on one side in the y-direction of the needle 36, and the second magnetic pole tooth 43B is situated on the other side thereof. Further, the arm portions 39 are situated on both sides in the x-direction of the needle 36.

Between the needle 36 and the first magnetic pole tooth 43A and the second magnetic pole tooth 43B, there are respectively provided gaps 44A and 44B. Also between the needle and the arm portions 39, there are provided similar gaps.

The gaps 44A and 44B can be secured, for example, by adjusting the installation position of a linear guide (not shown) guiding the needle 36. The linear guide may be, for example, a member having a roller bearing, or a member provided on one side or both sides in the y-direction of the needle 36. By securing the gaps 44A and 44B, it is possible to suppress friction generated in the needle 36, and to suppress attenuation of the reciprocating power.

The above-mentioned connection portion 35 is fixed to one end of the needle 36, and a support portion 54 mentioned below is fixed to the other end thereof.

<Spring 40>

The spring 40 imparts a force in the z-direction in accordance with displacement from a neutral point (displacement of the spring 40 when it is of natural length) to the needle 36. One end of the spring 40 is fixed to the support portion 54 provided at the other end of the needle 36, and the other end thereof is fixed to a fixation portion 55.

The support portion 54 is fixed to the other end of the needle 36, and is situated on the opposite side of the compressor main body 3A with respect to the armature 50 in the z-direction. The fixation portion 55 is fixed to the vehicle 200, for example, directly or indirectly, and is situated on the −z side of the support portion 54. The fixation portion 55 is fixed to the armature 50 via the non-magnetic spacer 53, and the armature 50 is mounted to the housing (not shown) of the compressor 3 and is substantially stationary with respect to the vehicle 200. The armature 50 may be mounted to the housing via a vibration-proof rubber or the like.

The support portion 54 relatively moving with respect to the armature 50 is situated on the +z side of the fixation portion 55, so that when the spring 40 is displaced to the +z side of the neutral point, the spring 40 is placed in a tensioned state, and when it is displaced to the −z side, it is placed in a compressed state. Further, in the spring 40 of the present embodiment, when it is displaced to the +z side of the neutral point, there is generated a spring force in the −z-direction, and, when it is displaced to the −z side, there is generated a spring force in the +z-direction, and acts on the needle 36. The neutral point can be arranged such that it is between the displacement of the spring 40 when the displacement of the piston 34 is at the top dead center and the displacement of the spring 40 when it is at the bottom dead center. Further, for example, it may be set that the displacement of the spring 40 when the displacement of the piston 34 is at the stroke center (the midpoint of the top dead center and the bottom dead center) substantially coincides with the neutral point, or it may be set on the top dead center side thereof as described below.

In the following, to simplify the description, the displacement of the spring 40 may be referred to through the displacement of the piston 34. For example, in a context in which the displacement of the spring 40 is described, the term: "top dead center," "bottom dead center," or "stroke center" may mean the "displacement of the spring 40 when the piston 34 is situated at the top dead center, the bottom dead center, or the stroke center."

<Action of the Force due to the Air Pressure, the Magnetic Force, and the Spring Force during Driving>

Figure 5:
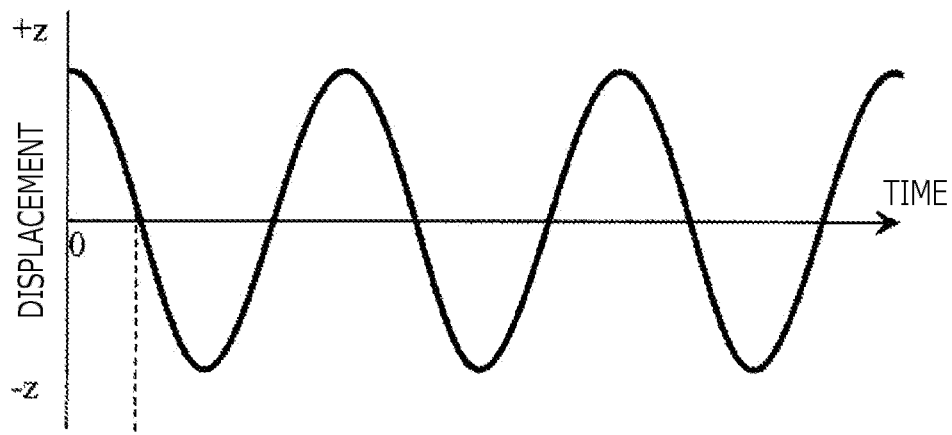
FIG. 5 is a diagram illustrating a displacement of a piston with respect to time and the relationship among a force due to an air pressure, an electromagnetic force, and a spring force, which are applied to a piston, with respect to time according to embodiment 1.
Figure 5:
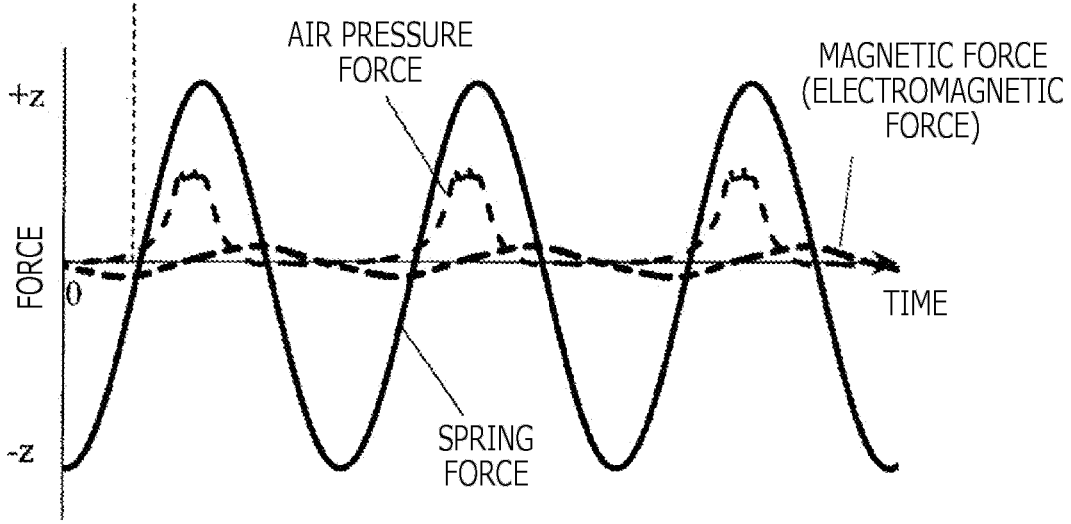

FIG. 5 is a diagram illustrating the displacement of the piston 34 with respect to the time t, the relationship among the force due to the air pressure, the magnetic force, and the spring force, which are applied to the piston 34. In the graph of FIG. 5(a), the vertical axis indicates the displacement of the piston 34, and the horizontal axis indicates time. In the graph of FIG. 5(b), the vertical axis indicates force, and the horizontal axis indicates time. As described above, the force due to the air pressure of the compression chamber 42, the magnetic force (electromagnetic force) due to the armature 50 and the permanent magnet 38, and the force due to the urging means (the spring force in the present embodiment) act on the piston 34.

Referring to FIG. 5, the state in which the compression chamber 42 is most expanded (the state in which the piston 34 is at the bottom dead center is expressed as: t=0. The motion of the piston 34 from t=0 (compression operation process) will be described. In FIGS. 5(a) and 5(b), the way the time progresses is the same. The point at which z=0 is the stroke center of the piston 34. A point within the range of z<0 is on the top dead center side, and a point within the range of z>0 is on the bottom dead center side. For the convenience in illustration, it will be assumed here that the stroke center coincides with the neutral point of the spring 40. In the compressor 3, the reciprocating motion is effected not by a crank mechanism but by the linear motor 3B, so that the positions of the bottom dead center and the top dead center are not always fixed. In the following, however, a case will be described where the reciprocating motion of the piston 34 is stable and where the top dead center and the bottom dead center are substantially fixed. As in the case of the start of the compressor 3, while the stroke length is fluctuating, in the movement in the +z-direction or in the −z-direction of the piston 34, the position at the time when the speed is 0 can be regarded as the bottom dead center or the top dead center. In the compressor 3 of the present embodiment, the armature 50 controls the magnetic force imparted to the needle 36 such that the bottom dead center is situated on the +z-direction side of the neutral point of the spring 40, and that the top dead center is situated on the −z-direction side of the neutral point of the spring 40.

<<When the Piston is at the Bottom Dead Center>>

When the piston 34 is at the bottom dead center, the spring 40 is displaced (tensioned) to the bottom dead center side of the neutral point, so that the piston 34 receives a large force toward the top dead center from the spring 40. The piston 34 is not displaced to the −z side of the bottom dead center, so that the magnitude of the spring force toward the top dead center is maximum.

In this state, the volume of the compression chamber 42 is maximum, so that the force due to the air pressure at this time is minimum. There are no particular restrictions regarding the magnetic force. Since, however, the force due to the spring 40 is large, it is desirable to apply, as shown in FIG. 5(b), the well-known synchronous motor control method so that a relatively small force, and more preferably, substantially 0, may result. A method of realizing such a magnetic force in the present embodiment will be described below.

Thus, the piston 34 at the bottom dead center receives a force toward the top dead center mainly from the spring 40.

<<When the Piston is on the Bottom Dead Center Side>>

As the piston 34 moves from the bottom dead center to the top dead center side, the spring 40 is displaced from the tensioned state to the natural length state, so that the spring force is reduced. The force due to the air pressure at this time is increased as the air inside the compression chamber 42 is compressed. Regarding the magnetic force, it is desirable to apply the well-known synchronous motor control method so that the force in the top dead center direction may be increased.

Thus, the piston 34 on the bottom dead center side receives a force toward the top dead center by the spring 40 and the magnetic force.

<<When the Piston is at the Stroke Center>>

The case where the piston 34 further moves to the top dead center side and reaches the stroke center will be described. As described above, it will be assumed that the stroke center coincides with the neutral point. As described below, however, it is not always necessary for the neutral point to coincide with the stroke center, and it can be set on the top dead center side of the stroke center.

When the piston 34 is at the stroke center, the speed of the needle 36 is maximum, and the spring 40 is displaced to the natural length state, with the spring force being minimum. The force due to the air pressure is gradually increased. Regarding the magnetic force, it is desirable to apply the well-known synchronous motor control method so that the force in the direction of the top dead center may be maximum.

<<When the Piston is on the Top Dead Center Side>>

When the piston 34 gets over the displacement point 0 to reach the top dead center side of the stroke center, the spring 40 is placed in the compressed state, and the direction of the spring force is switched to the direction of the bottom dead center. The force due to the air pressure is gradually increased. Regarding the magnetic force, it can be delayed by 90 degrees, for example, with respect to the displacement of the needle. As described below, in the present embodiment, the force in the direction of the top dead center is gradually decreased to be switched to a force in the direction of the bottom dead center.

Thus, the piston 34 on the top dead center side starts to accumulate energy in the spring 40, and is reduced in speed.

<<When the Piston is in the Vicinity of the Top Dead Center>>

When the piston 34 reaches a position in the vicinity of the top dead center, the force in the direction of the bottom dead center due to the spring 40 is gradually increased. Further, the rate at which the volume reduction ratio of the compression chamber 42 is increased, so that the rate at which the pressure in the compression chamber 42 is increased is increased, and the force due to the air pressure increases abruptly. The increase in the pressure in the compression chamber 42 functions as a trigger, and the discharge valve 31 is opened, and the air inside the compression chamber 42 is discharged, so that the force in the direction of the bottom dead center due to the air pressure becomes substantially fixed, and attains a peak. The magnetic force to the top dead center approaches 0, and is reversed to be switched to the bottom dead center side.

<<When the Piston is at the Top Dead Center>>

When the speed of the piston 34 is reduced to 0, the piston 34 has reached the top dead center. At this time, the spring 40 has completed the accumulation of the energy of the piston 34, and is compressed to the maximum. The spring force in the direction of the bottom dead center and the force in the direction of the bottom dead center due to the air pressure exceed the force in the direction of the top dead center, and the piston 34 is switched to the expanding operation process in which it moves at the speed toward the bottom dead center side. As described above, the compressor 3 receives a reciprocating power by the linear motor 3B, so that the position of the top dead center is not always fixed.

<<After the Switching to the Expanding Operation Process>>

There are generated a reduction in pressure due to the discharge through the discharge valve 31 and a reduction in pressure due to an increase in the volume of the compression chamber 42, so that the force in the direction of the bottom dead center due to the air pressure is abruptly reduced. Further, since the spring 40 approaches the neutral point, the force in the direction of the bottom dead center due to the spring 40 is also gradually diminished. Regarding the magnetic force, it is desirable for the force in the direction of the bottom dead center to be gradually increased.

When the piston 34 moves in the direction of the bottom dead center and reaches the stroke center, the spring force is reduced to zero. The force due to the air pressure is also reduced. Regarding the magnetic force, it is desirable for the force in the direction of the bottom dead center to be maximum.

When the piston 34 reaches the bottom dead center side of the stroke center, the spring force is switched to the top dead center side, and the force due to the air pressure is further reduced. Regarding the magnetic force, it is desirable for the force in the direction of the bottom dead center to be gradually reduced.

When the spring force in the direction of the top dead center and the force due to the air pressure exceed the force in the direction of the bottom dead center, and the speed of the piston 34 is reduced to zero, the piston 34 has reached the bottom dead center. That is, there has been attained a state in which the volume of the compression chamber 42 is maximum. From this onward, this periodical operation is repeated.

<Relationship between Displacement and Each Force>

Figure 6:
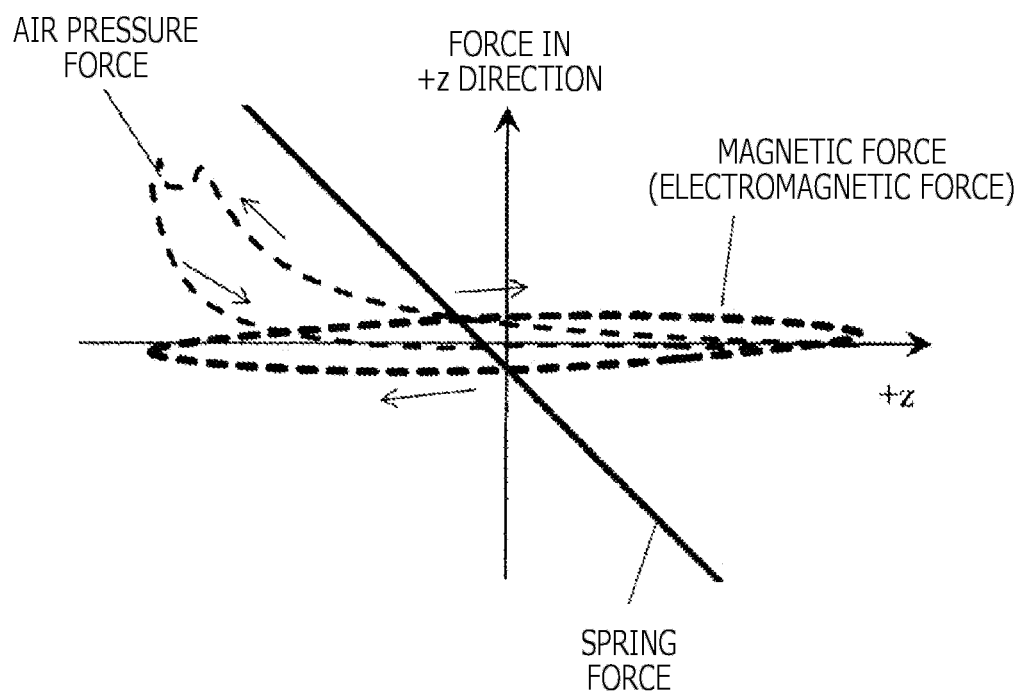
FIG. 6 is a diagram illustrating the relationship among the position of the piston in the z-direction and the spring force, the force due to the air pressure, and the magnetic force, which are applied to the piston, according to embodiment 1.

FIG. 6 is a diagram illustrating how the spring force, the force due to the air pressure, and the magnetic force, which are applied to the piston 34, are related to the displacement of the piston 34. The vertical axis indicates the force applied to the piston 34. The positive direction indicates the force exerted in the +z-direction, and the negative direction indicates the force exerted in the −z-direction. The intersection of the vertical axis and the horizontal axis is the origin, and the point where z=0 is the stroke center.

In the example of FIG. 6, the neutral point of the spring 40 is on the top dead center side of the stroke center of the piston 34. In the case where the neutral point of the spring 40 coincides with the stroke center of the piston 34, the straight line indicating the spring force in FIG. 6 passes the origin. Otherwise, it is the same as the above case.

The force due to the air pressure constantly applies a force in the +z-direction to the piston 34, so that, by setting the spring neutral point on the top dead center side of the stroke center, it is possible to place the stroke center of the piston 34 further on the −z side. That is, it is easier to set the stroke center of the piston 34 on the z-direction dimension center side of the cylinder 33, making it possible to elongate the stroke maximum length.

<Generation of the Magnetic Force and the Magnetic Path>

Figure 7:
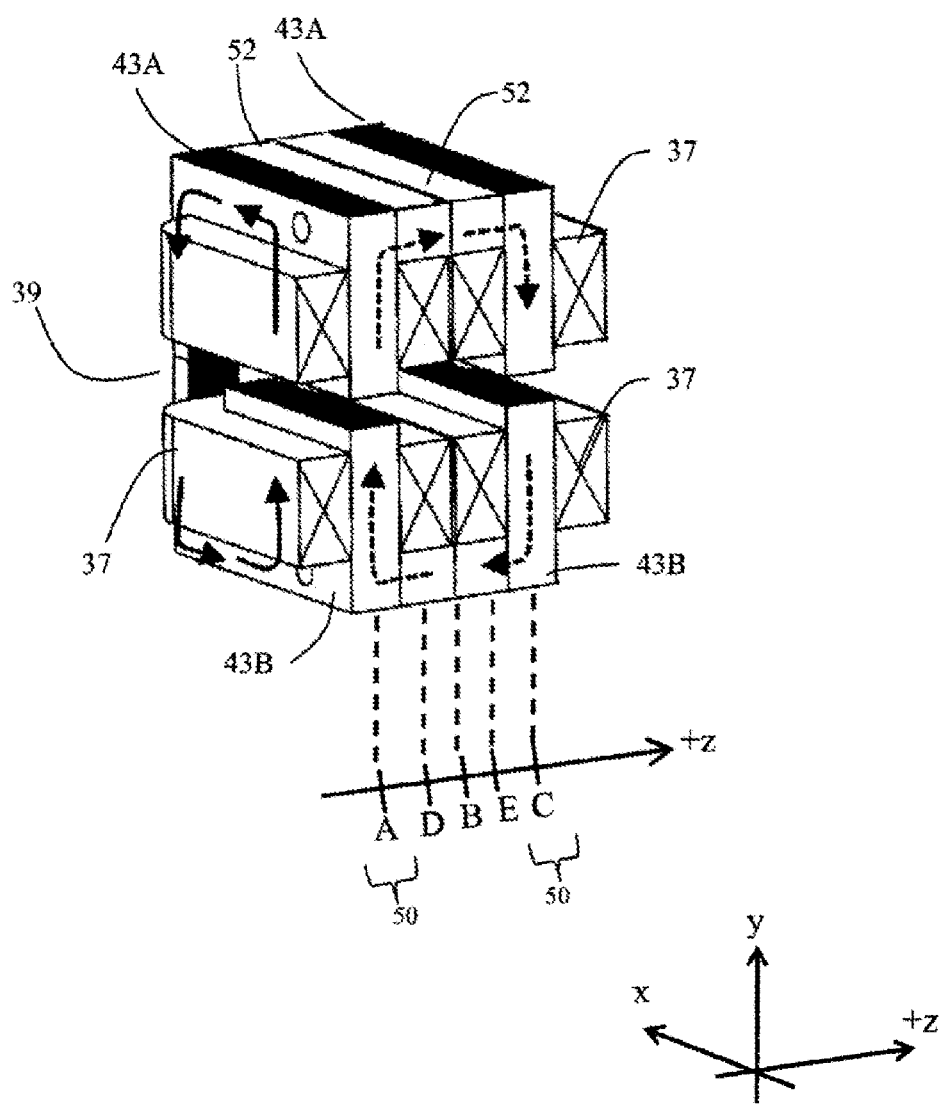
FIG. 7 is a sectional perspective view of two armatures that a linear motor according to embodiment 1 has and a magnetic spacer provided between them.

FIG. 7 is a sectional perspective view of two armatures 50 that a linear motor 3B according to the present embodiment has and a magnetic spacer 52 provided between them.

It is possible to connect a power source including an inverter circuit, etc. to the coil 37 wound around the magnetic pole tooth 43 of each armature 50, and cause a designated electric current to flow through it. When an AC current or voltage as mentioned above is applied to the coil 37, there is generated a magnetic flux passing through the iron core 41 which is a magnetic body. The magnetic flux flows through a magnetic path including the arm portions 39 and the first magnetic pole tooth 43A and the second magnetic pole tooth 43B as a magnetic path formed, for example, in the xy-plane as indicated by the solid arrow. As a result, the first magnetic pole tooth 43A is magnetized into an N-pole or S-pole, and the opposing second magnetic pole tooth 43B is magnetized into an S-pole or N-pole. The frequency and polarity of the current or voltage are controlled by various well-known synchronous motor methods, whereby it is possible to generate a magnetic repulsive force and a magnetic attraction force between the permanent magnet 38 arranged in the needle 36 and the magnetic pole tooth 43, making it possible to impart a reciprocating power in the z-direction to the needle 36.

Further, in the present embodiment, the two armatures 50 arranged in the z-direction are connected by a magnetic spacer 52. As a result, as indicated by the dashed line arrow, the magnetic flux generated flows through a magnetic path formed in the yz-plane, i.e., between the respective first magnetic pole teeth 43A and the respective second magnetic pole teeth 43B of two armatures 50, and through the magnetic path including the magnetic spacer 52 provided between the two first magnetic pole teeth 43A and the two second magnetic pole teeth 43B.

In this way, in the present embodiment, it is possible to form two kinds of magnetic paths formed in two planes, so that it is possible to suppress magnetic flux saturation. That is, it is possible to form a linear motor 3B of high output power.

As shown in FIG. 3(*a*), the coils 37 are connected such that the magnetic flux direction is reversed between the armatures 50 adjacent to each other via the magnetic spacer 52 as indicated by the two arrows 45.

When an electric current or voltage is applied to the coils 37, the magnetic attraction force and magnetic repulsive force exerted on the needle 36 has a y-direction component as indicated by the arrows 46A and 46B. On each of the permanent magnets 38 arranged in the needle 36, there is exerted either a magnetic attraction force for a magnetic repulsive force between the magnetic pole teeth 43 on both sides in the y-direction, with the result that the y-direction component of the magnetic force is substantially canceled.

<Control of the Magnetic Force>

As shown in FIG. 7, with attention being paid to the two armatures 50 arranged side by side, suppose that the z-coordinate of the magnetic pole tooth 43 on the −z-direction side is A, that the z-coordinate of the magnetic pole tooth 43 on the +z-direction side is C, that the z-coordinate of the midpoint between A and C is B, that the z-coordinate of the midpoint between A and B is D, and that the z-coordinate of the midpoint between B and C is E.

In the following, to be described will be the magnetic force in the z-direction that one permanent magnet 38 arranged in the needle 36 receives from the magnetized magnetic pole tooth 43. For the sake of simplification, it will be stated below that the permanent magnet 38 has the N-pole in the +y-direction, and that it has the S-pole in the −y-direction. However, the same description holds true if the magnetizing direction of the permanent magnet 38 is reversed.

When the center in the z-direction of the permanent magnet 38 is situated at A, the permanent magnet 38 receives no force in the z-direction from the magnetic pole teeth 43 situated at A, and when the center in the z-direction of the permanent magnet 38 is situated at C, the permanent magnet 38 receives no force in the z-direction from the magnetic pole teeth 43 situated at C. This is due to the fact that the angle made by the straight line passing through the magnetic pole tooth 43A, the magnetic pole tooth 43B, and the permanent magnet 38 and the z-axis is 90 degrees.

Further, when the center in the z-direction of the permanent magnet 38 is situated at A, the permanent magnet 38 only receives a small force from the magnetic pole teeth 43 situated at C, and when the center in the z-direction of the permanent magnet 38 is situated at C, the permanent magnet 38 only receives a small force from the magnetic pole teeth 43 situated at A. This is due to the fact that the distance between the permanent magnet 38 and the magnetic pole teeth 43 is large.

For example, it is desirable that the time at which only zero or a small force is thus imparted, that is, the time at which the permanent magnet 38 is situated at A or C, substantially coincide with the time at which the spring force is large. That is, it is desirable to design the spring constant of the spring 40, the magnitude of the electric current or voltage applied to the coil 37, etc., and to drive the compressor 3 such that when the permanent magnet 38 is situated at A, the position of the piston 34 substantially coincides with the top dead center, and that when the permanent magnet 38 is situated at C, the position of the piston 34 substantially coincides with the bottom dead center. The electric current or voltage applied to the coil 37 when the permanent magnet 38 is situated at A and C can be set to a relatively small value, and more preferably, substantially zero. The z-coordinate of the specific top dead center and the bottom dead center is not restricted to that of this preferable mode but can be adjusted as appropriate through the design of the magnitude of the electric current or voltage, etc. applied to the coil 37.

When the center in the z-direction of the permanent magnet 38 is situated at B, the angle made by the straight line passing through the centers of the magnetic pole teeth 43 situated at A and C and of the permanent magnet 38 and by the z-axis is, for example, approximately 45 degrees. Further, the distance between the magnetic pole teeth 43 and the permanent magnet 38 is relatively small, so that the permanent magnet 38 receives a large force in the z-direction. Thus, it is desirable to control the electric current or voltage applied to the coil 37 such that when the piston 34 is moving toward the top dead center, there is imparted a force toward the top dead center and when the piston is moving toward the bottom dead center, there is imparted a force toward the bottom dead center. That is, it is desirable to form the compressor 3 such that B substantially coincides with the stroke center. At this time, the electric current or voltage applied to the coil 37 can be set to a relatively large value, more preferably, a peak value.

<Starting of the Compressor 3>

Figure 8:
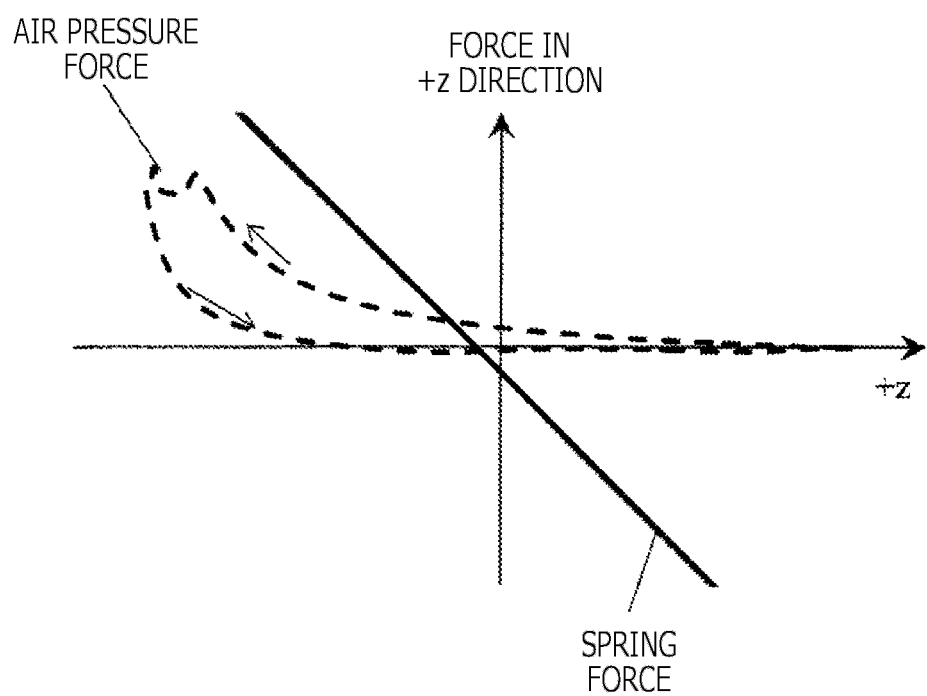
FIG. 8 is a diagram obtained by removing the magnetic force from FIG. 6.

FIG. 8 is a diagram obtained by removing the magnetic force from FIG. 6.

When the compressor 3 is at rest, the needle 36 is stationary at a position where the forces applied to the needle 36 is balanced. The force due to the air pressure always imparts a force to the +z-side to the piston 34, so that in the case where there is applied a compressor using no linear motor 3B as the motor of the compressor 3, for example, a compressor adopting a rotary motor and a crank mechanism, to start the compressor when the compressor has stopped at the bottom dead center or in the vicinity of the bottom dead center, it is necessary to apply a force in the direction of the top dead center larger than the force due to the air pressure by an electric current or voltage applied to the motor, causing the piston to reach the top dead center. Thus, the requisite electric current or voltage for the starting is large. This force due to the air pressure can make the starting gradually easier if the discharge path opening/closing valve 19 is placed at the open position (a), since the differential pressure between the suction port 3C and the discharge port 3D decreases with passage of time. If, however, the valve is set at the closed position (b), the differential pressure is maintained, so that the starting is not to be made easy.

The compressor 3 of the present embodiment is equipped with the linear motor 3B as the motor and the spring 40 as the urging means, so that when the piston 34 receives a force to the +z-side because of the force due to the air pressure, the spring 40 which is the urging means can be displaced to the +z-side of the neutral point. In this case, the spring 40 imparts a force in the −z-direction to the piston 34. When, as in the present embodiment, the fixation portion 55 is situated on the −z side with respect to the support portion 54, the spring 40 is in the tensioned state, and imparts a force in the −z-direction. On the other hand, when the fixation portion 55 is situated on the +z side with respect to the support portion 54, the spring 40 is in the compressed state, and imparts a force in the −z-direction.

In this way, the force in the −z-direction due to the spring 40 partially or totally cancels the force in the +z-direction due to the air pressure, so that the starting of the compressor 3 can be effected easily. Thus, between the moment when the compressor is stopped and the moment when it is started again, it is possible to maintain the position setting of the discharge path opening/closing valve 19 at the closed position (b), so that the energy-saving property of the air suspension system 100 is improved, and the necessity for reducing the pressure of the air chambers 1C and 2C to start the compressor 3 is reduced. Thus, it is possible to achieve an improvement in terms of the comfort of the occupants of the vehicle 200.

The specific starting method will be described. Before the starting, the needle 36 is stationary at the position where the force in the +z-direction due to the air pressure and the force in the −z-direction due to the urging means are balanced with each other. When an AC electric current or voltage is applied to the coil 37, it is possible to impart a magnetic force in the +z-direction or the −z-direction to the needle 36. The piston 34 is being urged in the −z-direction by the urging means, so that the piston can reach the top dead center at the time of driving as mentioned above with a relatively small amount of energy. Further, the piston 34 can be balanced on the top dead center side of the bottom dead center or the vicinity of the bottom dead center at the time of driving as mentioned above, so that it is possible to start the compressor 3 even when a magnetic force is imparted not only in the −z-direction but also in the +z-direction. In any case, there is generated, in accordance with the movement of the needle 36, compression or tension of the spring 40, and expansion or compression of the air inside the compression chamber 42. As described below, the frequency of the AC current or voltage is caused to substantially coincide with the resonance frequency of the needle 36, whereby energy is gradually accumulated in the spring 40 and the air spring inside the compression chamber 42, and the amplitude of the needle 36 is gradually increased. Thus, even in a condition in which the pressure of the compression chamber 42 is high, the compressor 3 can be started by applying a relatively small value of electric current or voltage to the coil 37.

It is only necessary for the urging means to be capable of imparting a force toward the top dead center to the needle 36 at the time of starting the compressor 3. It is not restricted to the spring 40, which is a coil spring. It is also possible to adopt a potential imparting portion such as an elastic body like a plate spring or rubber or an electromagnet.

<Driving Frequency of the Compressor 3>

The resonance frequency of the needle 36 and the frequency (driving frequency) of the AC electric current flowing through the coil 37 are caused to substantially coincide with each other, whereby it is possible to accumulate the energy imparted to the needle 36 in the spring 40 or the like. As a result, it is possible to increase the amplitude of the needle 36.

The resonance frequency of the needle 36 is generally determined by the mass of the needle 36, the pressure in the compression chamber 42, and the physical properties of the urging means, for example, the spring constant of the spring 40. When the operation is performed such that this resonance frequency substantially coincides with the number of times that the reciprocating motion of the needle 36 is made per unit time (driving frequency), it is possible to cause the reciprocating motion of the needle 36 with a small amount of energy, so that it is advisable for the command signal sent to the coil 37 to be this resonance frequency.

[Operation of the Air Suspension System 100]

Next, the operation of the air suspension system 100 will be described with reference to FIG. 1, etc. again.

(When the Vehicle Height is to be Increased)

Figure 9:
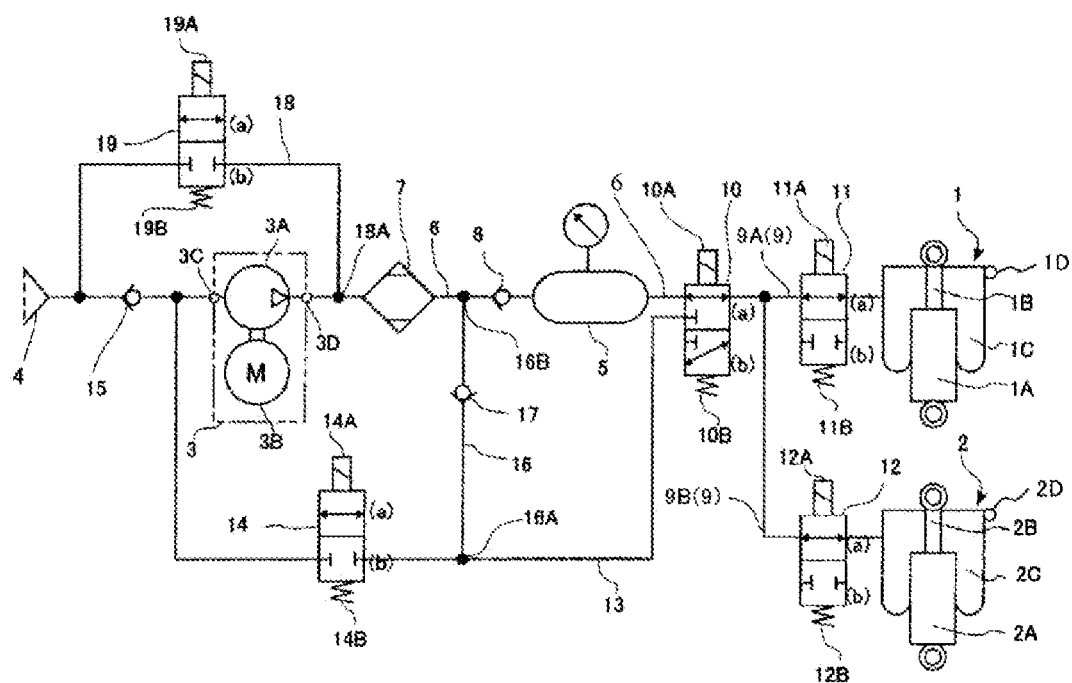
FIG. 9 is a circuit diagram of the air suspension system, illustrating the valve switching condition when the vehicle height is increased in embodiment 1.

FIG. 9 is a circuit diagram of the air suspension system 100, illustrating the valve switching state when the vehicle height of the vehicle 200 is to be increased. When increasing the vehicle height, the pressure supply, for example, to the interior of the first tank 5 is completed, and further, the compressor 3 is stopped. In this state, the return path opening/closing valve 14 and the discharge path opening/closing valve 19 are maintained at the closed position (b). In this state, the solenoid 10A of the supply/discharge switching valve 10 is excited, whereby the supply/discharge switching valve 10 is switched to the supply position (a). At the same time, the solenoids 11A and 12A of the suspension control valves 11 and 12 are excited, whereby the suspension control valves 11 and 12 are switched to the open position (a).

As a result, the compressed air in the first tank 5 is guided to the supply/discharge path 9, and is supplied to the air chambers 1C and 2C of the air suspensions 1 and 2 via the supply/discharge path 9. As a result, it is possible to increase the vehicle height. When air is to be supplied solely to part of the air suspensions 1 and 2, the suspension control valve of the air suspension to which air is to be supplied is placed at the open position (a), and the suspension control valve of the other air suspension is placed at the closed position (b). This makes it possible to perform fine vehicle height adjustment in the case where the load applied to the air suspensions is not uniform.

When the vehicle height increasing operation is completed, the suspension control valves 11 and 12 are switched to the closed position (b). As a result, the air chambers 1C and 2C of the air suspensions 1 and 2 are sealed, so that the air suspensions 1 and 2 are maintained in the expanded state, making it possible to maintain the vehicle height in the increased state.

In the case where the pressure in the first tank 5 is reduced to a predetermined pressure or less during the vehicle height increasing operation, the compressor 3 may be driven. In the case where the pressure in the first tank 5 is the predetermined pressure or less when the vehicle height increasing operation is to be started, the supply pressure control described below may be performed while driving the compressor 3. Further, the supply pressure control described below may be performed while driving the compressor 3 without depending on the pressure in the first tank 5.

(When the Vehicle Height is to be Reduced)

Figure 10:
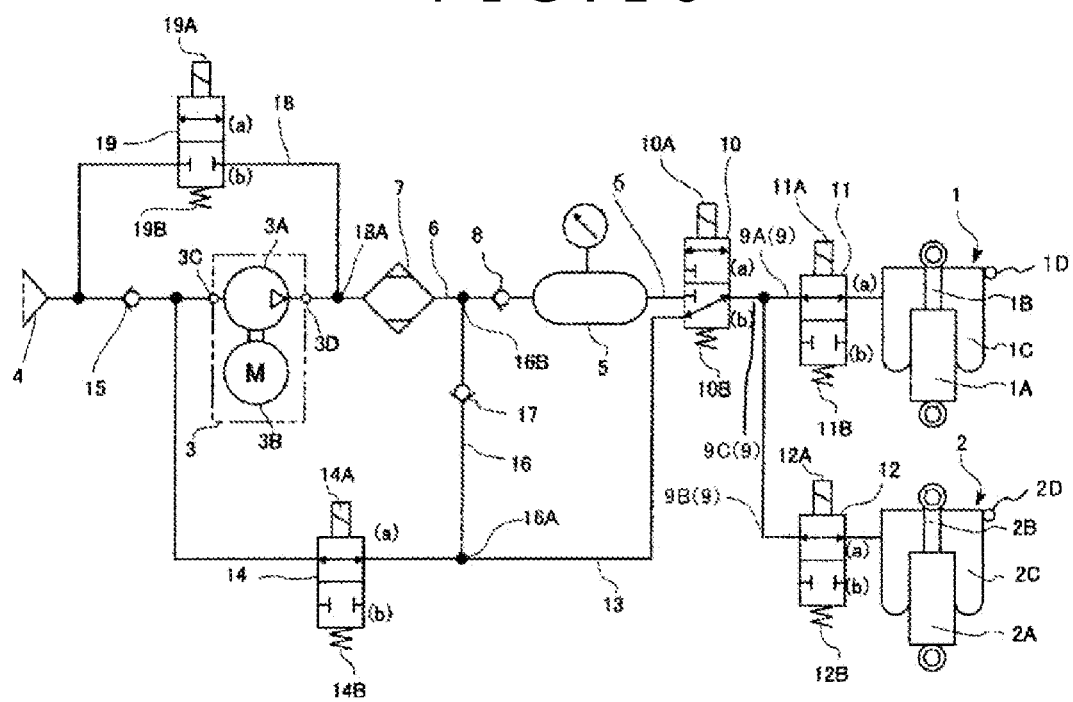
FIG. 10 is a circuit diagram of the air suspension system, illustrating the valve switching condition when the vehicle height is decreased in embodiment 1.

FIG. 10 is a circuit diagram of the air suspension system 100, illustrating the valve switching state when the vehicle height of the vehicle 200 is to be reduced. When reducing the vehicle height, the supply/discharge switching valve 10 is maintained at the discharge position (b), and the discharge path opening/closing valve 19 is maintained at the closed position (b). In this state, the solenoid 14A of the return path opening/closing valve 14 is excited, whereby the return path opening/closing valve 14 is switched to the open position (a). At the same time, the solenoids 11A and 12A of the suspension control valves 11 and 12 are excited, whereby the suspension control valves 11 and 12 are switched to the open position (a). Further, the compressor 3 is driven.

As a result, the air in the air chambers 1C and 2C of the air suspensions 1 and 2 is guided to the return path 13 via the distribution supply/discharge paths 9A and 9B and the combination supply/discharge path 9C. The air guided to the return path 13 is passed through the return path opening/closing valve 14 and guided to the suction port 3C of the compressor 3 being driven before being compressed by the compressor 3. After this, it is stored in the first tank 5 via the supply path 6 and the air dryer 7. As a result, air is discharged from the air chambers 1C and 2C, whereby it is possible to reduce the vehicle height. When solely a part of the suspension control valves 11 and 12 is placed in the discharge state, it is possible to reduce solely the corresponding air suspension in size. This makes it possible to perform fine vehicle height adjustment when the load applied to the air suspensions is not uniform.

After the vehicle height reducing operation is completed, the suspension control valves 11 and 12 are switched to the closed position (b). As a result, the distribution supply/discharge paths 9A and 9B are closed, and the air chambers 1C and 2C are sealed, so that the air suspensions 1 and 2 are maintained in the reduced state, whereby it is possible to maintain the vehicle height in the reduced state.

The compressed air in the air chambers 1C and 2C is supplied to the suction port 3C, so that when the supply/discharge switching valve 10 is at the discharge position (b) and the return path switching valve 14 is at the open position (a), the pressure at the suction port 3C can be estimated from the condition of the open/closed positions of the suspension control valves 11 and 12 and the pressure in the air chambers 1C and 2C. Thus, by providing pressure sensors 1D and 2D measuring the pressure of the air chambers 1C and 2C connected to the suspension control valves 1 and 2, and gaining pressure information on the suspension control valves at the open position (a), it is possible to effectively estimate the spring constant of the air spring of the compression chamber 34. In particular, it is possible to effectively estimate the frequency of the electric current or voltage to be supplied to the coil 37 at the time of starting the compressor 3.

(When Abruptly Reducing the Vehicle Height)

When abruptly reducing the vehicle height in order to stabilize, for example, the attitude of the vehicle 200 at the time of swing traveling, the supply/discharge switching valve 10 is maintained at the discharge position (b), and the return path opening/closing valve 14 is maintained at the closed position (b). In this state, the solenoid 19A of the discharge path opening/closing valve 19 is excited, whereby the discharge path opening/closing valve 19 is switched to the open position (a). At the same time, the solenoids 11A and 12A of the suspension control valves 11 and 12 are excited, whereby the suspension control valves 11 and 12 are switched to the open position (a). The compressor 3 is kept at rest.

Due to this operation, the air in the air chambers 1C and 2C is dissipated into the atmosphere through the external air intake port via the return path 13, the bypass path 16, and the discharge path 18. As a result, air is abruptly discharged from the air chambers 1C and 2C, making it possible to abruptly reduce the vehicle height.

When abruptly reducing the vehicle height, the air discharged from the air suspensions 1 and 2 passes through the bypass path 16 and the air dryer 7 to flow to the discharge path 18. As a result, it is possible to remove water from the drying agent filling the interior of the air dryer 7, making it possible to regenerate the drying agent.

(When Supplying Pressure to the First Tank 5)

When, for example, compressed air is dissipated into the atmosphere, the pressure in the first tank 5 becomes relatively low. In this case, it is possible to perform the operation of enhancing the pressure in the first tank 5. As shown in FIG. 1, the compressor 3 is started, in the state in which the supply/discharge switching valve 10 is maintained at the discharge position (b) and in which the suspension control valves 11 and 12, the return path opening/closing valve 14, and the discharge path opening/closing valve 19 are maintained at the closed position (b).

As a result, the compressor 3 sucks in external air via the intake filter 4. This external air passes through the suction side path 20 and flows into the compression chamber 42 from the suction port 3C. After this, it is compressed, and discharged to the supply path 6 from the discharge port 3D. This compressed air is dried by the air dryer 7 before being accumulated in the first tank 5. When, for example, the pressure in the first tank 5 attains a fixed pressure, the compressor 3 is stopped. As a result, it is possible to fill the first tank 5 with a sufficient amount of compressed air.

The discharge path opening/closing valve 19 and the return path opening/closing valve 14 are at the closed position (b), so that the external air sucked in via the intake filter 3 can effectively advance to the suction port 3C. Further, the supply/discharge switching valve 10 is at the discharge position (b), so that it is possible to prevent the compressed air in the first tank 5 from being supplied to the air suspensions 1 and 2.

According to the present embodiment, the linear motor 3B equipped with the urging means is used as the drive source of the compressor 3, so that it is possible to easily start the compressor 3 from the balanced position of the needle 36 without depending on the pressure of the compression chamber 42. Thus, starting is possible with the relatively small thrust, so that it is possible to provide an air suspension system 100 using a small compressor 3 of a simple construction. In the case where the urging means is a spring, the spring may be a compression spring or a tensile spring.

Embodiment 2

The construction of embodiment 2 can be realized in the same manner as embodiment 1 except for the following points.

Figure 11:
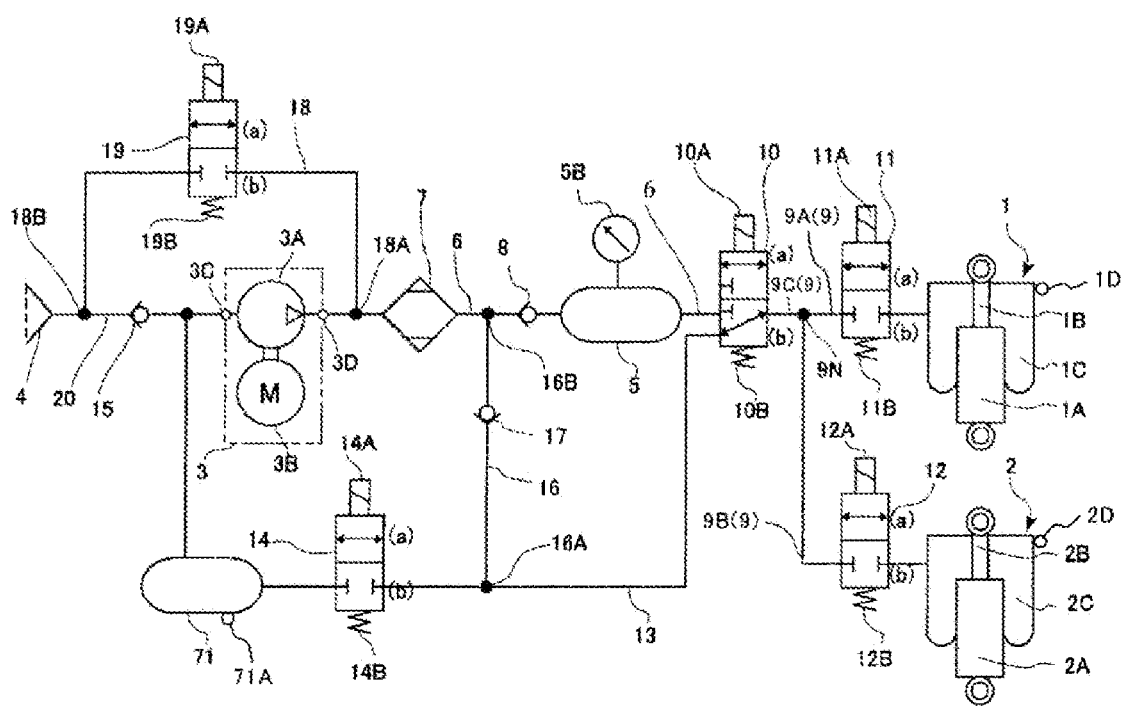
FIG. 11 is a circuit diagram illustrating an air suspension system according to embodiment 2.

FIG. 11 is a circuit diagram of the suspension system 100 according to the present embodiment. In the suspension system 100 of the present embodiment, a second tank 71 is provided in the return path 13. In the present embodiment, when reducing or abruptly reducing the vehicle height, the valves may be controlled as in the case of FIG. 10, thereby accumulating the compressed air of the air suspensions 1 and 2 in the second tank 71 without driving the compressor 3. Further, the supply/discharge switching valve 10 is placed at the discharge position (b), the return path opening/closing valve 14 is placed at the closed position (b), and the discharge path opening/closing valve 19 is placed at the closed position (b), and then the compressor 3 is started, and the air in the second tank 71 is compressed by the compressor 3, whereby it is possible to store compressed air in the first tank 5. After this, there is performed the operation of increasing the vehicle height, whereby it is possible to supply the compressed air in the second tank 71 to the air suspensions 1 and 2.

In the present embodiment, there is provided the second tank 71, so that the pressure on the suction port 3C side can exceed the atmospheric pressure. Thus, it is possible to reduce the differential pressure of the suction port 3C and the discharge port 3D. Thus, it is possible to further facilitate the starting of the compressor 3.

A pressure sensor 71A measuring the pressure of the second tank may be provided, and information obtained by this pressure sensor 71A may be used, for example, in starting the compressor 3 when reducing the vehicle height or in determining the driving frequency at the time of driving the compressor.

The present embodiment can provide the same effect as that of embodiment 1.

Embodiment 3

The construction of embodiment 3 can be realized in the same manner as that of embodiment 1 except for the following points.

Figure 12:
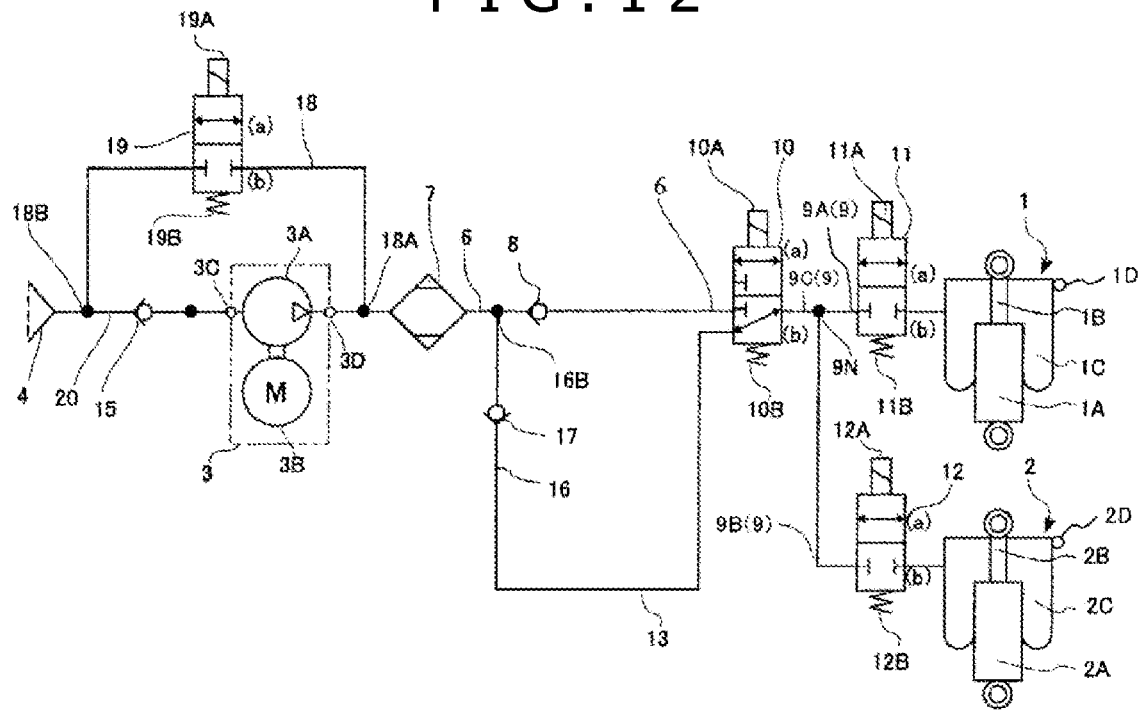
FIG. 12 is a circuit diagram illustrating an air suspension system according to embodiment 3.

FIG. 12 is a circuit diagram of the suspension diagram 100 of the present embodiment. The air suspension system 100 of the present embodiment is provided with no tank. The open circuit is constructed as follows: When increasing the vehicle height, air sucked in from the atmosphere is compressed by the compressor 3, and the compressed air is directly sent to the air chambers 1C and 2C. When reducing the vehicle height, the compressed air in the air chambers 1C and 2C is directly released into the atmosphere. More specifically, as compared with embodiment 1, the return path 13 is connected to the bypass path 16 but is not connected to the suction side path 20.

In the present embodiment also, it is possible to achieve the same effect as that of embodiment 1. At the time of discharging, the air can pass the air dryer 7, so that it is possible to effectively regenerate the air dryer 7.

Embodiment 4

The construction of embodiment 4 can be realized in the same manner as that of embodiment 3 except for the following points.

Figure 13:
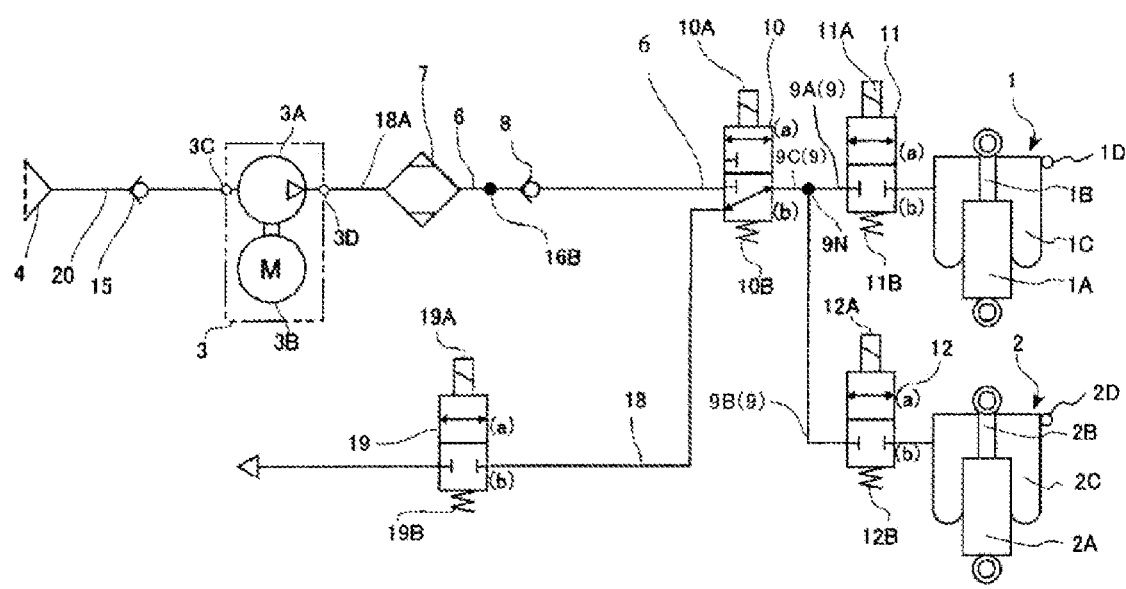
FIG. 13 is a circuit diagram illustrating an air suspension system according to embodiment 4.

FIG. 13 is a circuit diagram of the suspension system 100 of the present embodiment. A first end portion of a discharge path 18 is connected to the supply/discharge switching valve 10, and a second end portion thereof is open to the atmosphere. As compared with embodiment 3, the return path 13 and the bypass path 16 are removed. More specifically, the external air intake port, the second check valve 15, the compressor 3, the air dryer 7, the first check valve 8, and the supply/discharge switching valve 10 are connected together in that order, and they are not connected to the discharge path 18. Further, one end of the discharge path 18 is connected to the supply/discharge switching valve 10, and the other end thereof is open to the atmospheric air, with there being provided a discharge path opening/closing valve 19. This construction makes it possible to effect discharge with a small path length. The present embodiment can also provide the same effect as that of embodiment 1.

Embodiment 5

The construction of embodiment 5 can be realized in the same manner as that of one of embodiments 1 through 4 except for the following points.

Figure 14:
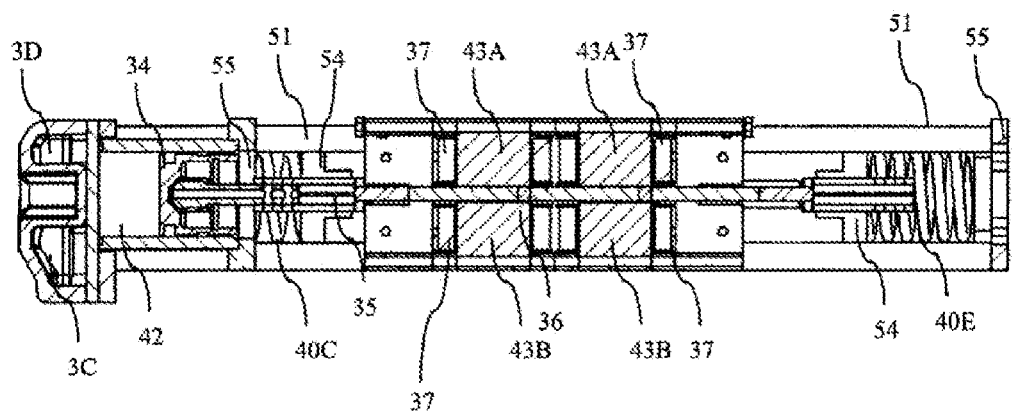
FIG. 14 is a sectional view of a compressor according to embodiment 5 taken along the yz-plane.
Figure 14:
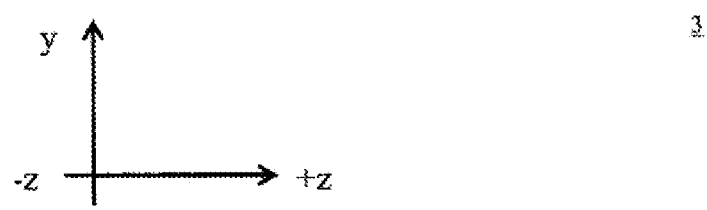

FIG. 14 is a side sectional view of the compressor 3 of the present embodiment taken along the yz-plane. As the spring 40 serving as the urging means, the compressor 3 has a top dead center side spring 40C connected to the top dead center side of the needle 36 and a bottom dead center side spring 40E connected to the bottom dead center side. According to the present embodiment, there are provided a plurality of urging means, whereby it is possible to augment the influence of the urging means as compared with the air spring of the compression chamber 42. Further, it is possible to facilitate the starting of the compressor 3. Or, each of the springs 40 can be diminished in size.

Each of the top dead center side spring 40C and the bottom dead center side spring 40E may be a compression spring or a tensile spring. One of them may be a compression spring, and the other may be a tensile springs, or both of them may be compression springs or tensile springs.

More preferably, one of the top dead center side spring 40C and the bottom dead center side spring 40E is used as a compression spring, and, most preferably, both of them are used as compression springs. Striving to return to the neutral point from the compressed state, the compression spring itself comes into contact with the needle 36 to press the needle 36, so that the springs 40 can be formed without having to firmly fix them to the support portion 54, etc.

The present embodiment can also provide the same effect as that of embodiment 1.

Embodiment 6

The construction of the present embodiment can be realized in the same manner as that of one of embodiments 1 through 5 except for the following points.

Figure 15:
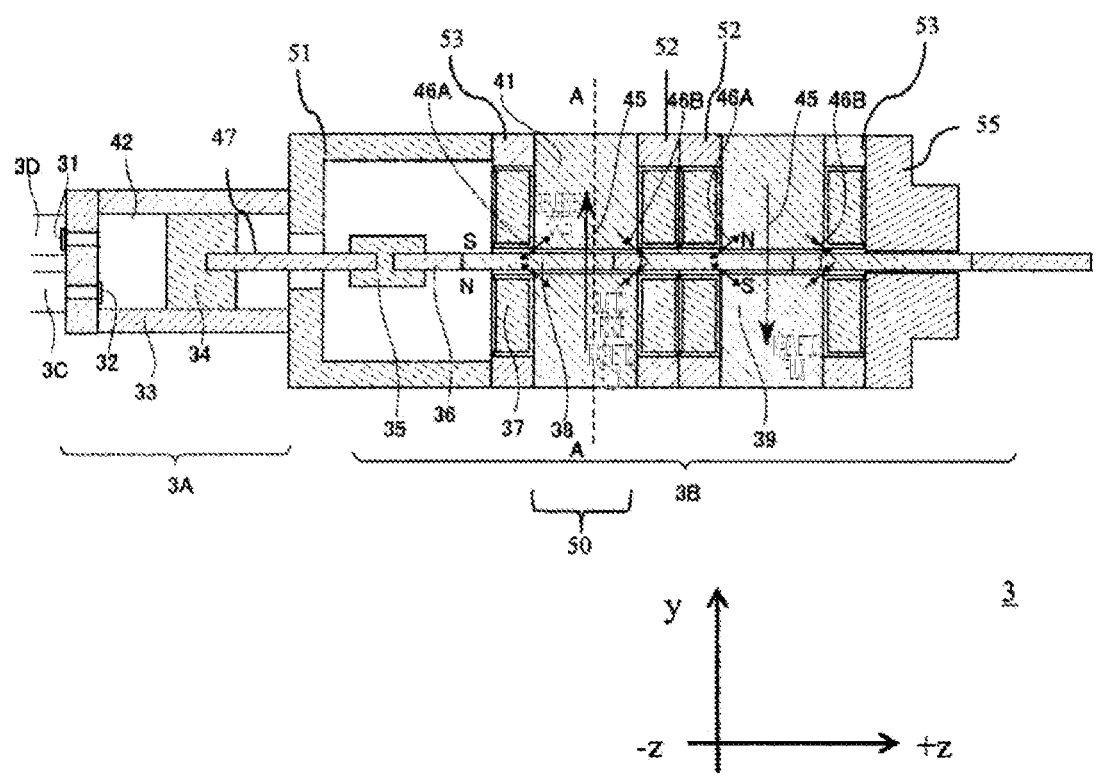
FIG. 15 is a sectional view of a compressor according to embodiment 6 taken along the yz-plane.
Figure 16:
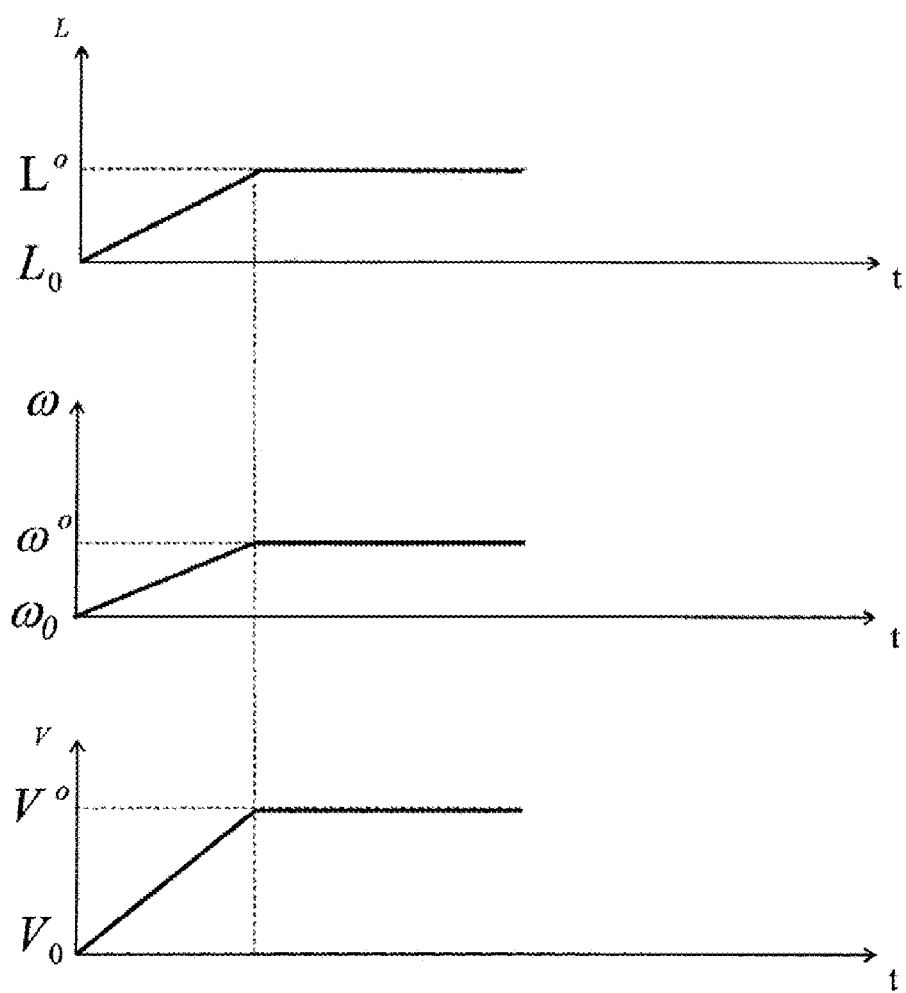
FIG. 16 is a graph illustrating how time t is related to a stroke command value L from the start of the compressor of embodiment 6 to the stationary state (the command value of the amplitude of the reciprocation of the needle or the piston), a command value ω of the frequency of the voltage applied to a coil, and a command value V of the amplitude of the applied voltage.

FIG. 15 is a sectional view of the compressor 3 according to the present embodiment taken along the yz-plane, and FIG. 16 is a graph illustrating how time t is related to a stroke command value L from the start of the compressor 3 of the present embodiment to the stationary state (the command value of the amplitude of the reciprocation of the needle 36 or the piston 34), a command value $\omega$ of the frequency of the voltage applied to the coil 37, and a command value V of the amplitude of the applied voltage. The compressor 3 adopts a linear motor 3B as the motor, so that it is possible to set as appropriate not only the frequency of the reciprocating motion of the piston 34 but also the stroke length. In the drive control of the compressor 3, it is possible to input the target values of L and $\omega$ and to compute V by the well-known motor control method. Utilizing the V as computed, voltage is applied to the coil 37 from an inverter or the like.

The needle 36 is provided with no urging means. The needle 36 reciprocates upon receiving a magnetic force issued from the armature 50 in accordance with the electric current flowing through the coil 37 due to the applied voltage mainly determined by $\omega$ and V. The amplitude of this reciprocating motion does not always coincide with the stroke command value L. Based on the stroke command value L, the voltage command value V is computed. However, to cause the actual stroke amount of the needle 36 to substantially coincide with the stroke command value L, it is necessary, when computing the voltage command value V, to take into consideration the work due to the compression and expansion of the air in the compression chamber 42. It should be noted, however, that it is also possible to adopt a method or the like in which solely the magnetic force imparted to the needle 36 is taken into consideration and in which the influence of the compression chamber 42 is not taken into consideration. Here, to simplify the description, it will be assumed that the stroke command value L coincides with the actual stroke of the piston 34.

Further, the reciprocating frequency of the needle 36 follows so as to coincide with $\omega$. When, however, $\omega$ is a value that is too large, it is impossible to follow the same. This is due to the fact that when the direction of the magnetic force is changed, for example, from the +z-direction to the −z-direction, the needle 36 decelerates in the +z-direction, and then starts to accelerate in the −z-direction, so that the moving direction of the needle 36 cannot be switched soon. When the direction of the magnetic force is switched in a period of time shorter than the requisite time for the acceleration/deceleration, the needle 36 can hardly move and performs small oscillation.

As described below, also in the present embodiment, it is possible to facilitate the starting of the compressor 3 of the air suspension system 100.

Suppose L, $\omega$, and V when the compressor 3 is in the stationary state (the state in which the piston 34 reciprocates, with the discharge amount of the compressor 3 per unit time being substantially the same) are L°, $\omega$°, and V°. When starting the compressor 3, a command is given, with the initial value of the stroke command value input being $L_0$, which is smaller than L°. More preferably, a command is given, with the initial value of the frequency command value being $\omega_0$, which is smaller than $\omega$°. As a result, the initial value $V_0$ of the voltage command value computed is a value which is smaller than V°. Then, the voltage applied to the coil 37 is a value smaller than V°, so that the piston 34 reciprocates at $L_0$ which is smaller than L°. That is, it is possible to alternately perform the compression process and the suction process at a relatively small stroke.

As described above, the compressor 3 of the present embodiment employs the linear motor 3B as the motor, so that the stroke initial value $L_0$ can be changed, which means it can be set to a small value. As a result, it is possible to avoid performing the compression process at a large stroke, e.g. L°, immediately after the start, so that it is possible to easily start the compressor 3. When, at this time, the frequency command value ω is also set small, it is possible to diminish the movement length of the piston 34 per unit time. That is, the frictional force per unit time can be kept at a small value, so that it is advantageously possible to start the compressor 3 more easily.

After this, the air suspension system 100 can gradually increase the stroke command value L and the frequency command value ω toward, for example, the stationary state as needed. That is, the compressor 3 has a condition in which the piston 34 is driven at a stroke larger than the stroke $L_0$ of the piston 34 immediately after the starting. Further, the compressor 3 preferably has a condition in which the piston 34 is driven at a frequency larger than the frequency $ω_0$ of the piston 34 immediately after the starting. In the case where urging means is provided as in embodiment 1, etc., the frequency value $ω_0$ may be set to a value smaller than the resonance frequency of the piston 34. That is, the frequency ω immediately after the starting may be set to a value smaller than the resonance frequency, and then it may be made larger to be set to the resonance frequency.

While in the present embodiment the voltage command value V imparted to the linear motor 3B is diminished at the time of starting and is then gradually increased, the stroke command value $L_0$ may be set to L°. In this case, the voltage command value is V° from immediately after the start, the stroke of the piston 34 is a value smaller than L°. More specifically, the speed is zero at the point where the force due to the air pressure and the magnetic force are substantially balanced, and, after the direction of the magnetic force is reversed, the movement is started in the opposite direction. Also by this method, it is possible to start the compressor 3 easily as in the case described above. In this case, however, it can happen that an overcurrent flows through the coil 37, so that it is desirable to provide a current limiter. Further, to avoid step out, it is desirable for the frequency command value $ω_0$ to be low at the start and to be increased gradually.

Here, in the case of a comparative example in which the compressor employs a crank mechanism, the stroke is uniquely determined by the diameter of the eccentric rotation of the crank mechanism. Here, the stroke of the compressor employing the crank mechanism is expressed as L°. When an attempt is made to start from the bottom dead center or a position in the vicinity of the bottom dead center, the starting of the compressor does not succeed if the stroke from the starting point to the top dead center, that is, the compressing operation over L° cannot be performed at one time immediately after the start. That is, a force continuing the compressing operation over L° must be imparted from the motor, and this stroke length 1° cannot be reduced. Thus, it is necessary to provide, for example, a large motor capable of imparting high current.

DESCRIPTION OF REFERENCE CHARACTERS 1, 2: Air suspension
3: Compressor
4: Intake filter
5: First tank
5B: Pressure sensor
6: Supply path
8: First check valve
9: Supply/discharge path
9A, 9B: Distribution supply/discharge path
9C: Combination supply/discharge path
10: Supply/discharge switching valve
11, 12: Suspension control valve
13: Return path
14: Return path opening/closing valve
15: Second check valve
16: Bypass path
17: Third check valve
18: Discharge path
19: Discharge path opening/closing valve
33: Cylinder
34: Piston
36: Needle
37: Coil
38: Permanent magnet
40: Spring
41: Iron core
42: Compression chamber
43: Magnetic pole tooth
47: Rod
51: End spacer
54: Support portion
55: Fixation portion
71: Second tank
100: Air suspension system

The invention claimed is:

1. An air suspension system in which air compressed by a compressor is supplied to a plurality of air chambers provided between a vehicle body side and a wheel side and configured to perform vehicle height adjustment in accordance with supply and discharge of air, the air suspension system comprising:
    a discharge port connected to a first discharge port side of the compressor, and including a discharge path which is capable of discharging compressed air on the discharge port side: and
    a discharge path opening/closing valve allowing execution of setting to a closed position in which circulation of air in the discharge path is cut off, and an open position in which the air in the discharge path can flow,
    wherein the compressor comprises:
    a rod connected to a piston and extending in a moving direction of the piston, a side of the rod not connected to the piston is connected to a connection portion,
    a needle connected to the connection portion extending in the moving direction of the piston,
    an armature reciprocating the needle in the moving direction of the piston, and
    a spring,
    wherein the discharge path opening/closing valve remains in a closed position from a time the compressor is stopped to a restart time of the compressor, and
    when the piston is subjected to a force on one side of the direction of travel by a force due to pneumatic pressure, the spring exerts force on the piston on a side opposite to the one side.

2. An air suspension system in which air compressed by a compressor is supplied to a plurality of air chambers provided between a vehicle body side and a wheel side and configured to perform vehicle height adjustment in accordance with supply and discharge of air, the air suspension system comprising:

a discharge port connected to a first discharge port side of the compressor, and including a discharge path is capable of discharging compressed air on the discharge port side: and a discharge path opening/closing valve allowing execution of setting to a closed position in which circulation of air in the discharge path is cut off, and an open position in which the air in the discharge path can flow, wherein the compressor comprises:

a rod connected to a piston and extending in a moving direction of the piston, a side of the rod not connected to the piston is connected to a connection portion, a needle connected to the connection portion extending in the moving direction of the piston, an armature reciprocating the needle in the moving direction of the piston, and urging means urging the needle in a direction of a top dead center of the piston, wherein the urging means is a spring, wherein the discharge path opening/closing valve remains in a closed position from a time the compressor is stopped to a restart time of the compressor, and when the piston is subjected to a force on one side of the direction of travel by a force due to pneumatic pressure, the spring exerts force on the piston on a side opposite to the one side.

3. The air suspension system according to claim 2, wherein the spring is placed in a compressed state and a tensioned state in accordance with the reciprocating motion of the piston; and a neutral point of the spring is on the top dead center side of a displacement when the piston is situated at a bottom dead center.

4. The air suspension system according to claim 3, wherein the neutral point of the spring is on the top dead center side than when the piston is situated at a stroke center.

5. The air suspension system according to claim 2, wherein the urging means includes two springs each provided on the top dead center side and a bottom dead center side with respect to the armature; and one or both of the two springs are compression springs kept in a compressed state during the reciprocating motion of the piston.

6. The air suspension system according to claim 2, wherein the spring is placed in a compressed state and a tensioned state in accordance with the reciprocating motion of the piston, the spring is located outside a main body and outside a fixation portion, and the main body the piston and a side of the rod connected to the piston.

7. An air suspension system comprising:

a plurality of air chambers provided between a vehicle body side and a wheel side and configured to perform vehicle height adjustment in accordance with supply and discharge of air;

a compressor compressing air;

a tank accumulating the air compressed by the compressor, with the air compressed by the compressor being stored in the tank, the air in the tank being supplied to the air chambers;

a discharge port connected to a first discharge port side of the compressor, and including a discharge path which is capable of discharging compressed air on the discharge port side; and a discharge path opening/closing valve allowing execution of setting to a closed position in which circulation of air in the discharge path is cut off, and an open position in which the air in the discharge path can flow, wherein the compressor comprises:

a rod connected to a piston and extending in a moving direction of the piston, a side of the rod not connected to the piston is connected to a connection portion, a needle connected to the connection portion extending in the moving direction of the piston, an armature reciprocating the needle in the moving direction of the piston, and urging means urging the needle in a direction of a top dead center of the piston, wherein the urging means is a spring, wherein the discharge path opening/closing valve remains in a closed position from a time the compressor is stopped to a restart time of the compressor, and when the piston is subjected to a force on one side of the direction of travel by a force due to pneumatic pressure, the spring exerts force on the piston on a side opposite to the one side.

8. The air suspension system according to claim 7, wherein there are provided:

discharge means discharging the air in the air chambers into atmosphere or the tank, and a condition in which a discharging operation by the discharge means is not performed at a start of the compressor.

9. The air suspension system according to claim 7, wherein when discharging the air in the air chambers, the compressor has a condition in which the air in the air chambers is compressed and supplied to the tank.

10. The air suspension system according to claim 7, further comprising a pressure sensor detecting pressure information on the air in the tank or the air chambers, wherein the pressure information is utilized when determining the driving frequency at a time of starting the compressor.

11. The air suspension system according to claim 7, wherein the spring is placed in a compressed state and a tensioned state in accordance with the reciprocating motion of the piston, the spring is located outside a main body and outside a fixation portion, and the main body the piston and a side of the rod connected to the piston.

* * * * *